United States Patent
Moseley et al.

[11] Patent Number: 6,124,920
[45] Date of Patent: Sep. 26, 2000

[54] OPTICAL DEVICE AND DIRECTIONAL DISPLAY

[75] Inventors: Richard Robert Moseley, Gloucestershire; Graham John Woodgate; David Ezra, both of Oxfordshire, all of United Kingdom

[73] Assignee: Sharp Kabushiki Kaisha, Osaka, Japan

[21] Appl. No.: 08/903,050

[22] Filed: Jul. 30, 1997

[30] Foreign Application Priority Data

Aug. 1, 1996 [GB] United Kingdom ............... 9616281

[51] Int. Cl.$^7$ .................. G02F 1/1335; G02F 1/13; G02B 27/22
[52] U.S. Cl. .................. 349/201; 349/15; 349/197; 359/464
[58] Field of Search .................. 349/15, 30, 196, 349/197, 201; 359/464, 472

[56] References Cited

U.S. PATENT DOCUMENTS

| | | | |
|---|---|---|---|
| 4,712,877 | 12/1987 | Okada et al. | 350/350 |
| 4,850,682 | 7/1989 | Gerritsen | 350/348 |
| 5,146,356 | 9/1992 | Carlson | 349/42 |
| 5,299,289 | 3/1994 | Omae et al. | 359/95 |
| 5,513,025 | 4/1996 | Watanabe et al. | 349/201 |
| 5,615,024 | 3/1997 | May et al. | 349/57 |
| 5,930,012 | 7/1999 | Mears et al. | 349/201 |
| 5,973,817 | 10/1999 | Robinson et al. | 359/247 |

FOREIGN PATENT DOCUMENTS

| | | |
|---|---|---|
| 0409188 | 1/1991 | European Pat. Off. . |
| 0433931 | 6/1991 | European Pat. Off. . |
| 0498498 | 8/1992 | European Pat. Off. . |
| 0608458 | 8/1994 | European Pat. Off. . |
| 0636917 | 2/1995 | European Pat. Off. . |
| 0671648 | 9/1995 | European Pat. Off. . |
| 19500699 | 7/1996 | Germany . |
| 3-119889 | 5/1991 | Japan . |
| 6-160822 | 6/1994 | Japan . |
| 2050033 | 12/1980 | United Kingdom . |
| 2198869 | 6/1988 | United Kingdom . |
| 2278222 | 11/1994 | United Kingdom . |
| 2296810 | 7/1996 | United Kingdom . |

OTHER PUBLICATIONS

European Search Report related to European Patent Application No. 97305757.3 dated Nov. 17, 1998.

Search Reports for Application No. GB 9616281.3; Dated May 30, 1997; Jun. 23, 1997; Oct. 22, 1996.

G. Toraldo et al., Nuovo Cim Suppl., vol. 9, pp. 426–435, 1952, "Super–Gain Antennas and Optical Resolving Power".

G. Boyer et al., Applied Optics, vol. 12, No. 4, pp. 893–894, Apr. 1973, "Superresolution by Taylor Filters".

B. R. Frieden, Optica Acta, vol. 16, No. 6, pp. 795–807, 1969, "On Arbitrarily Perfect Imagery With A Finite Aperture".

R. Boivin et al., Optica Acta, vol. 27, No. 5, pp. 587–610, 1980, "Optimized Amplitude Filtering for Superresolution Over a Restricted Field".

B. Dossier et al., Journ. Des Rech. C.N.R.S. n.11, pp. 49–69, 1950, "Apodisation Des Raies Spectrales Au Moyen D'Ecrans Absorbants".

*Primary Examiner*—William L. Sikes
*Assistant Examiner*—Toan Ton
*Attorney, Agent, or Firm*—Renner, Otto, Boisselle & Sklar

[57] ABSTRACT

An optical device includes a plurality of picture elements the phase and/or amplitude transmission of which vary in the lateral direction of the optical device reducing the level of diffraction caused by the device.

32 Claims, 23 Drawing Sheets

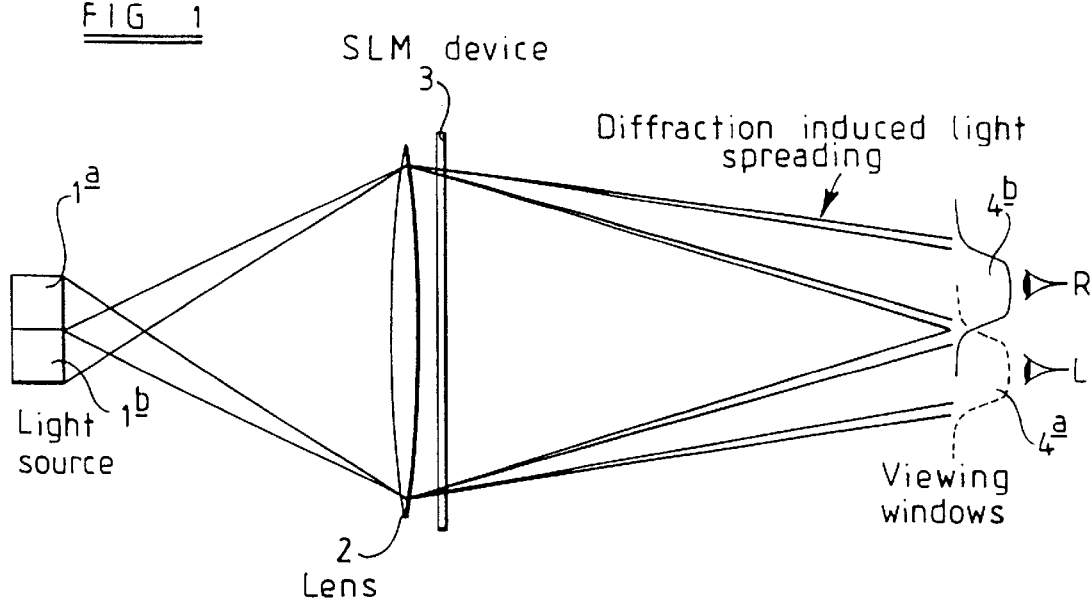
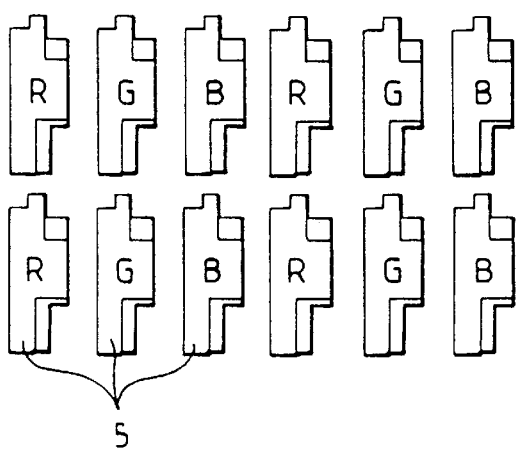
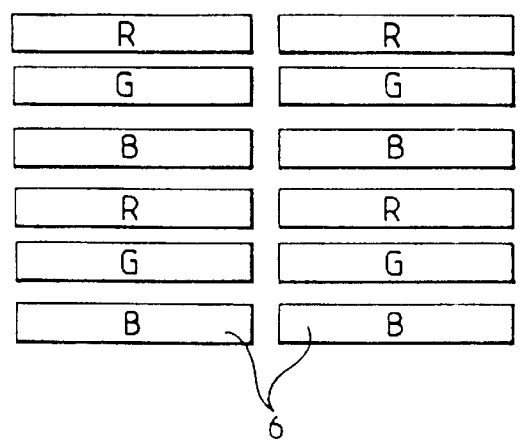

SLM device incorporating micro-polariser

Each pixel transmits only one polarisation state and the two images are spatially multiplexed, one in pixels of one polarisation and the other in the remaining pixels FIG 10
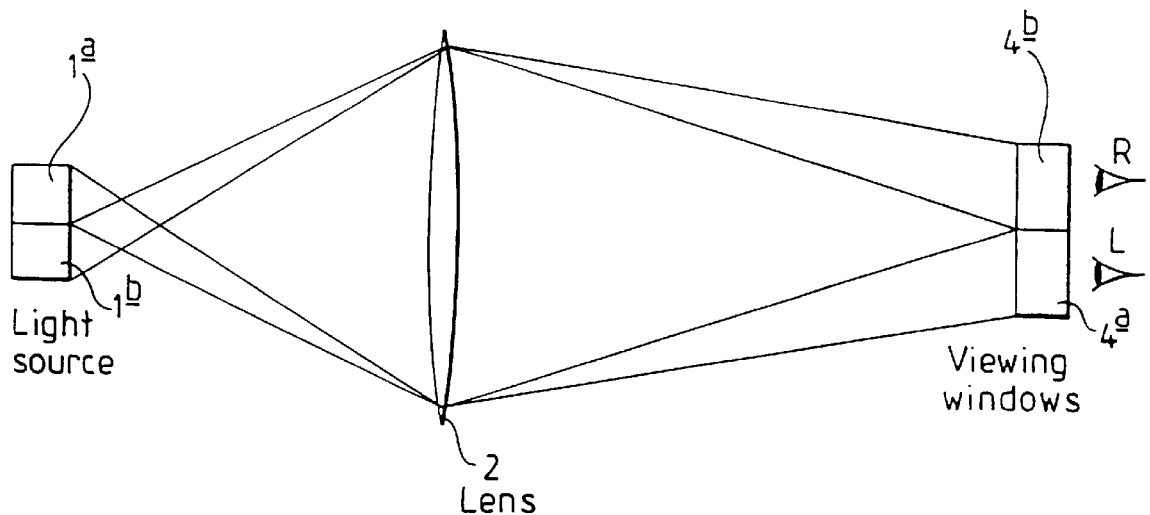
— Left eye window
------- Right eye window
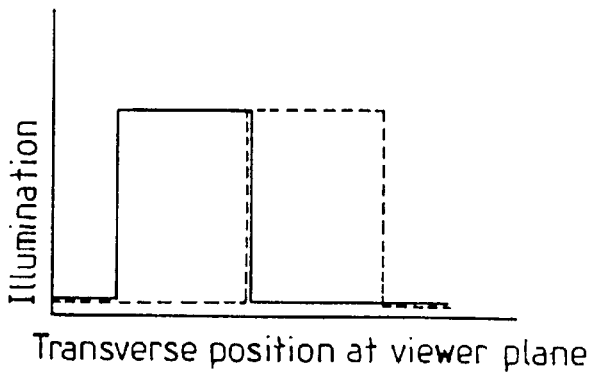

FIG 11a square
Pixel aperture transmission function
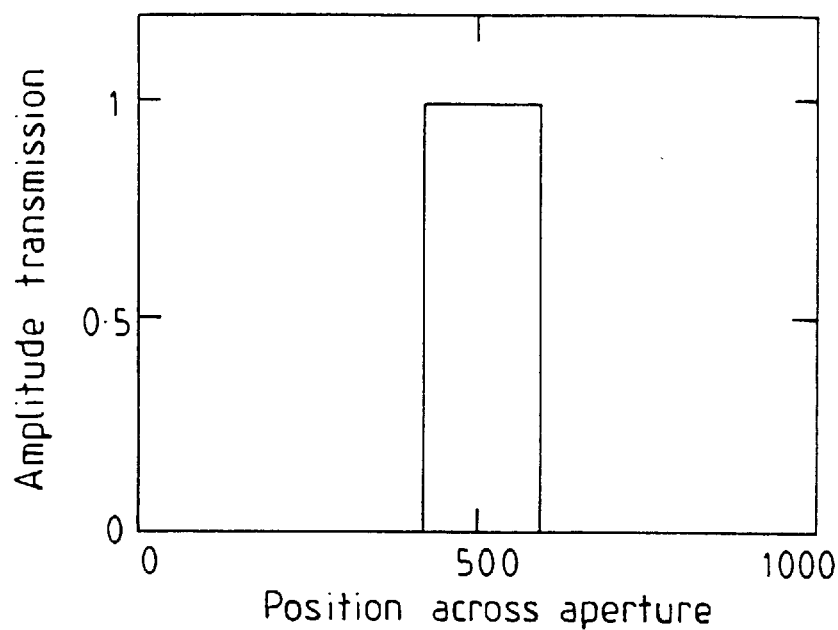
FIG 11b
Diffracted spot intensity profile
(from fast fourier transform)
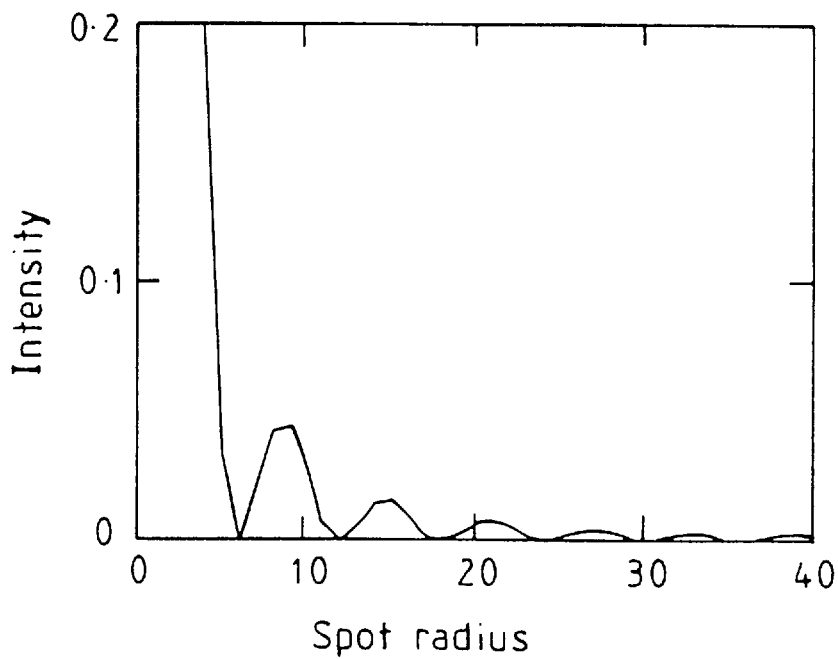

FIG 11c cosine
Pixel aperture transmission function
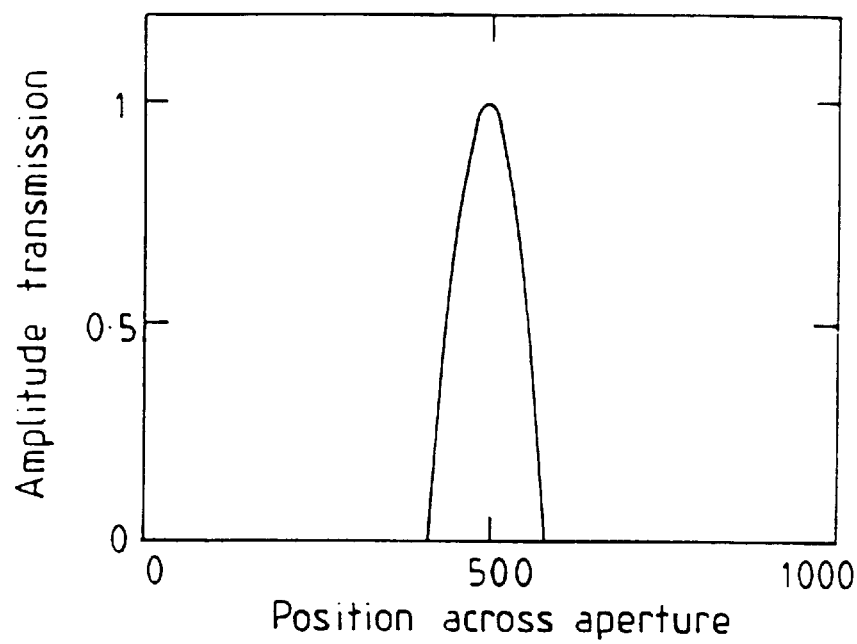
FIG 11d
Diffracted spot intensity profile (from fast fourier transform)
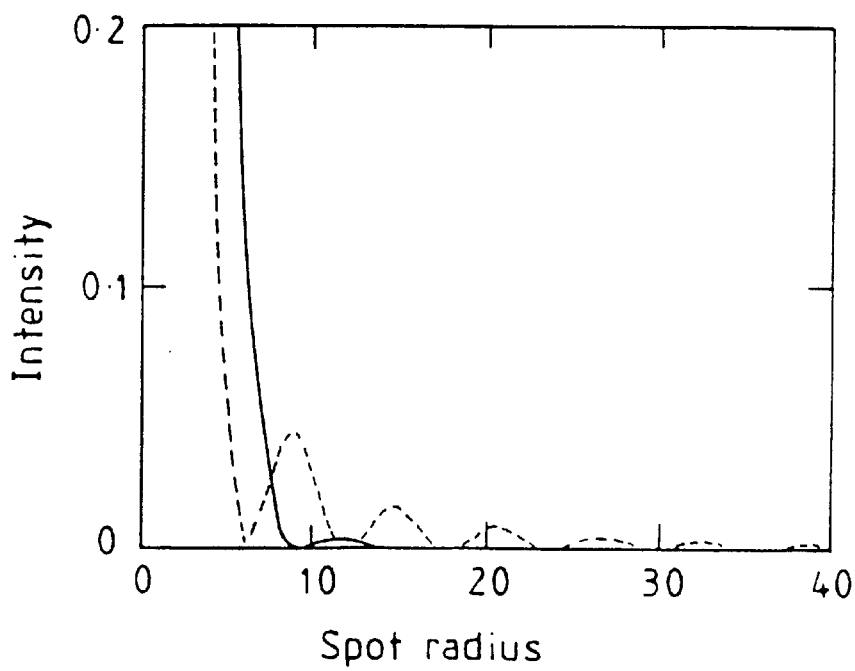

FIG 11e linear sloped
Pixel aperture transmission function
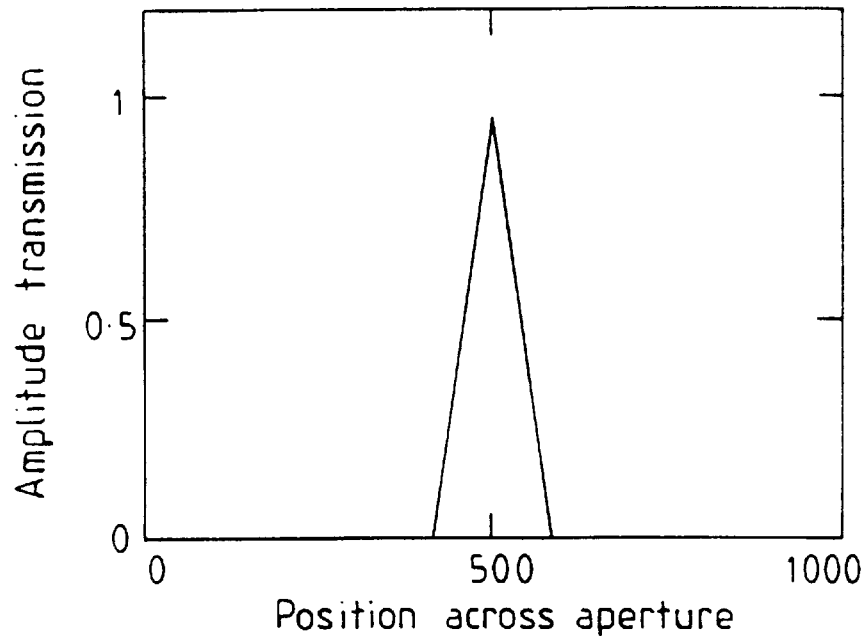
FIG 11f
Diffracted spot intensity profile
(from fast fourier transform)
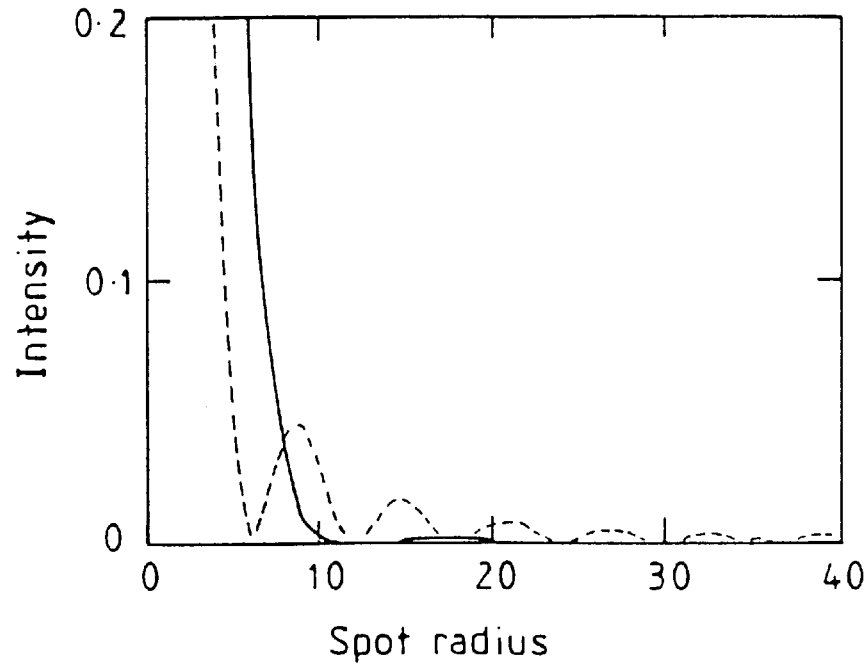

FIG 11g gaussian edged
Pixel aperture transmission function
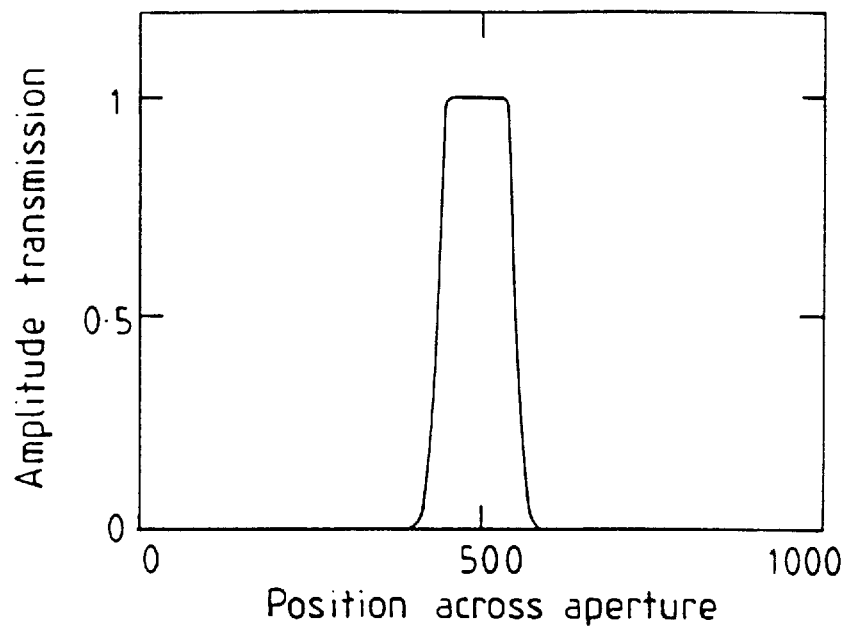
FIG 11h
Diffracted spot intensity profile
(from fast fourier transform)
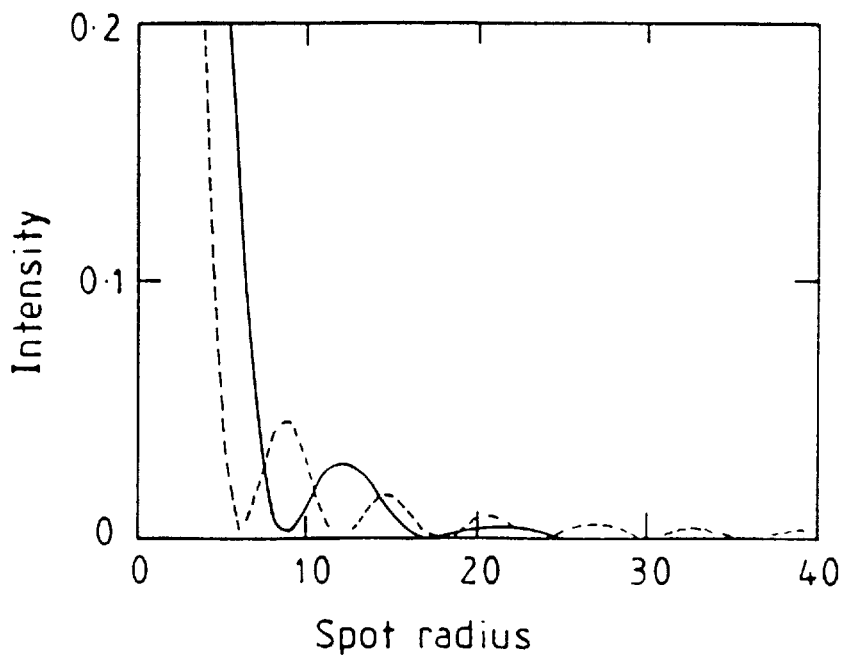

FIG 11i truncated gaussian
Pixel aperture transmission function
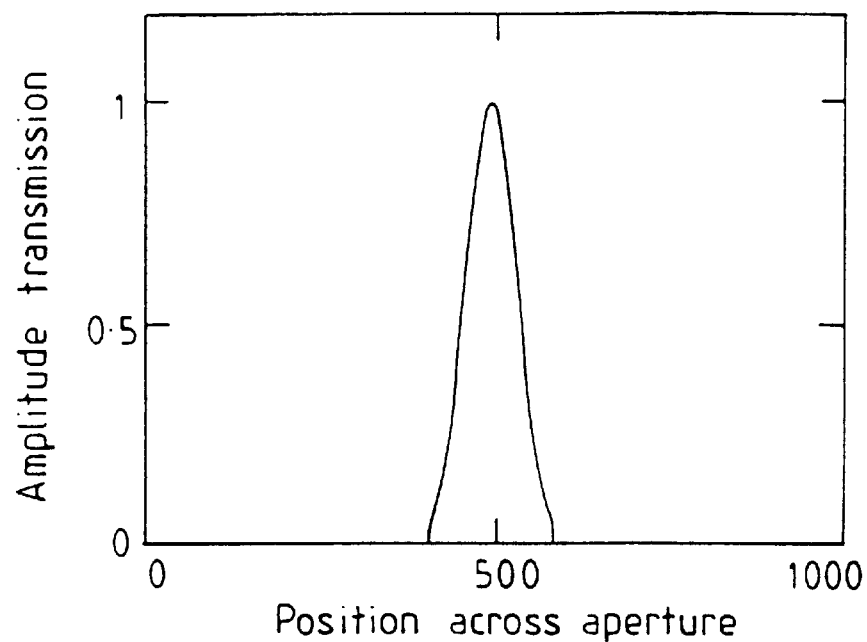
FIG 11j
Diffracted spot intensity profile (from fast fourier transform)
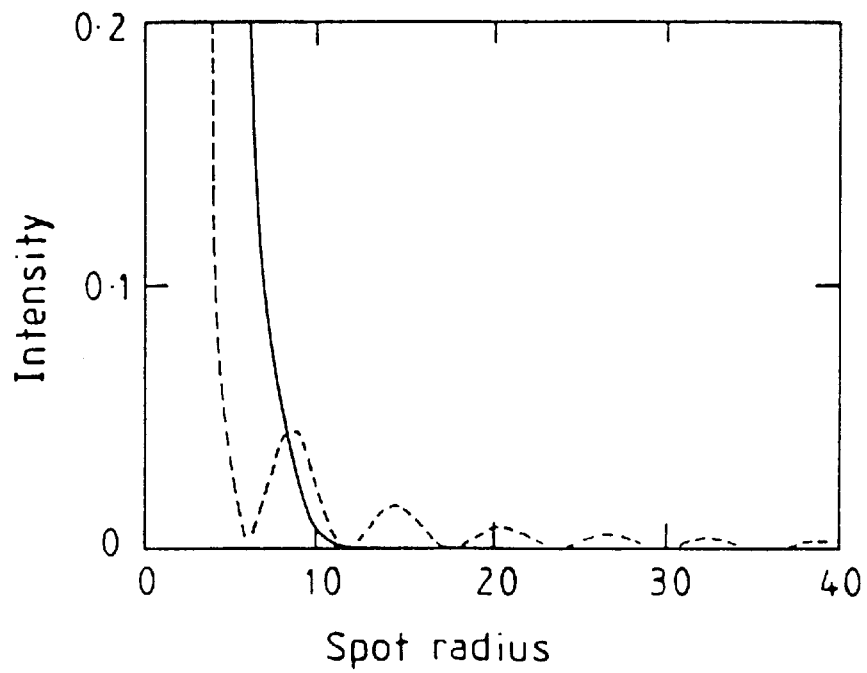

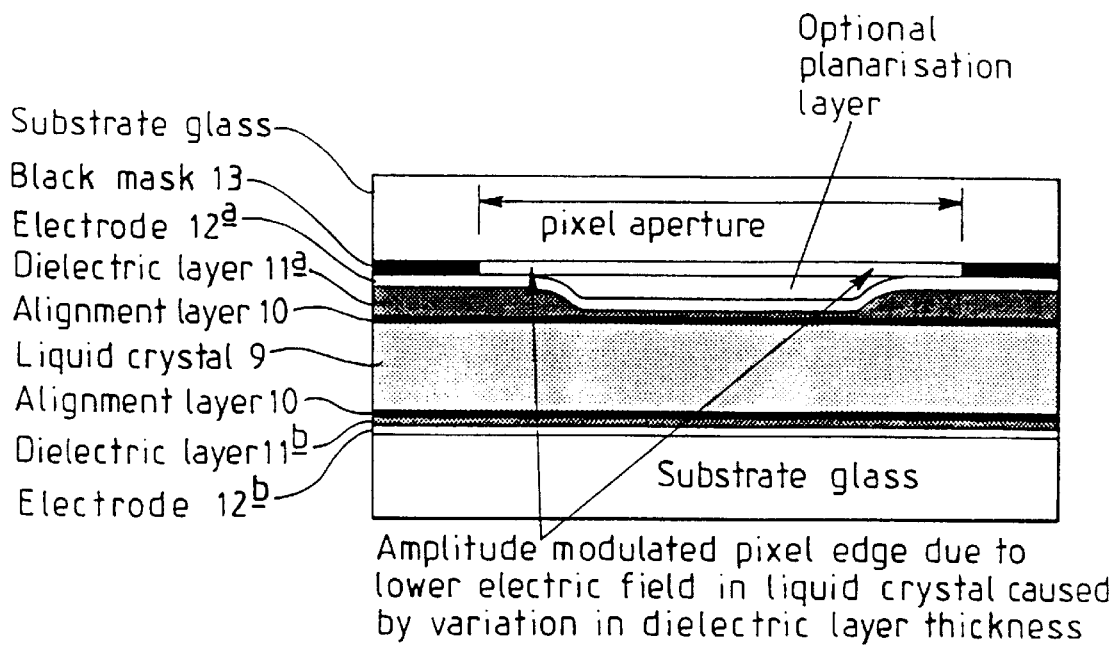
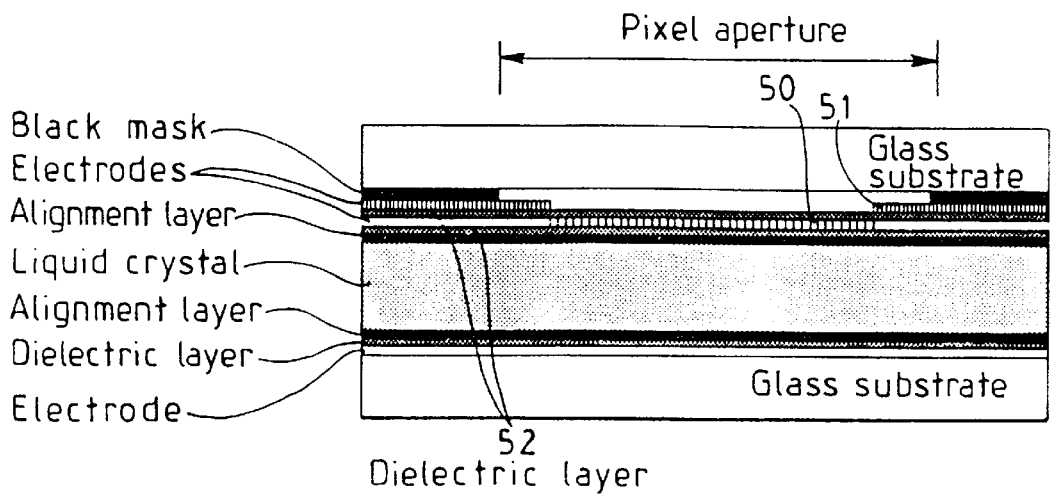

Use of a patterned colour filter layer to vary the amplitude transmission profile FIG 17
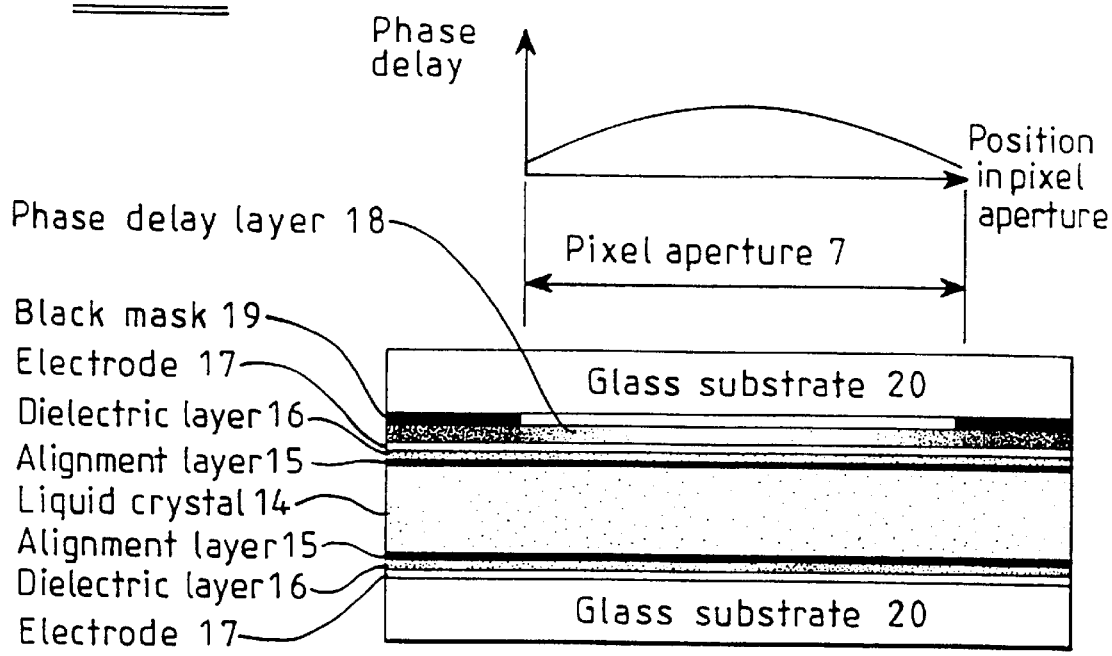
FIG 18 Phase delay structure using an internal output polariser before a birefringent phase delay layer
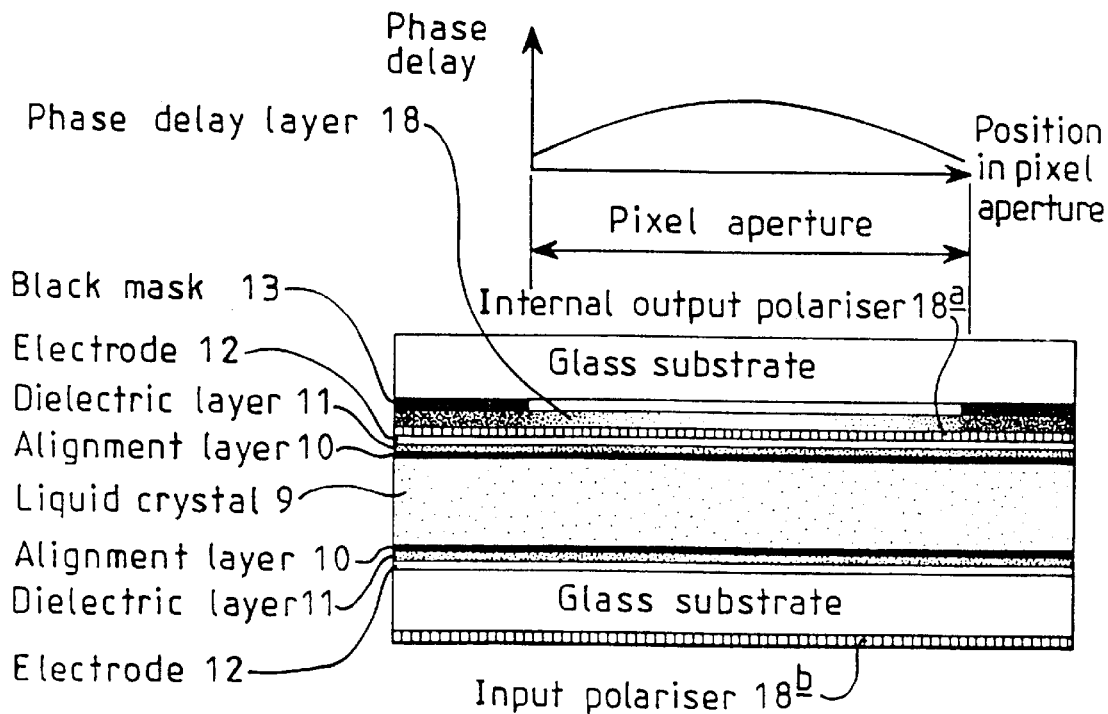

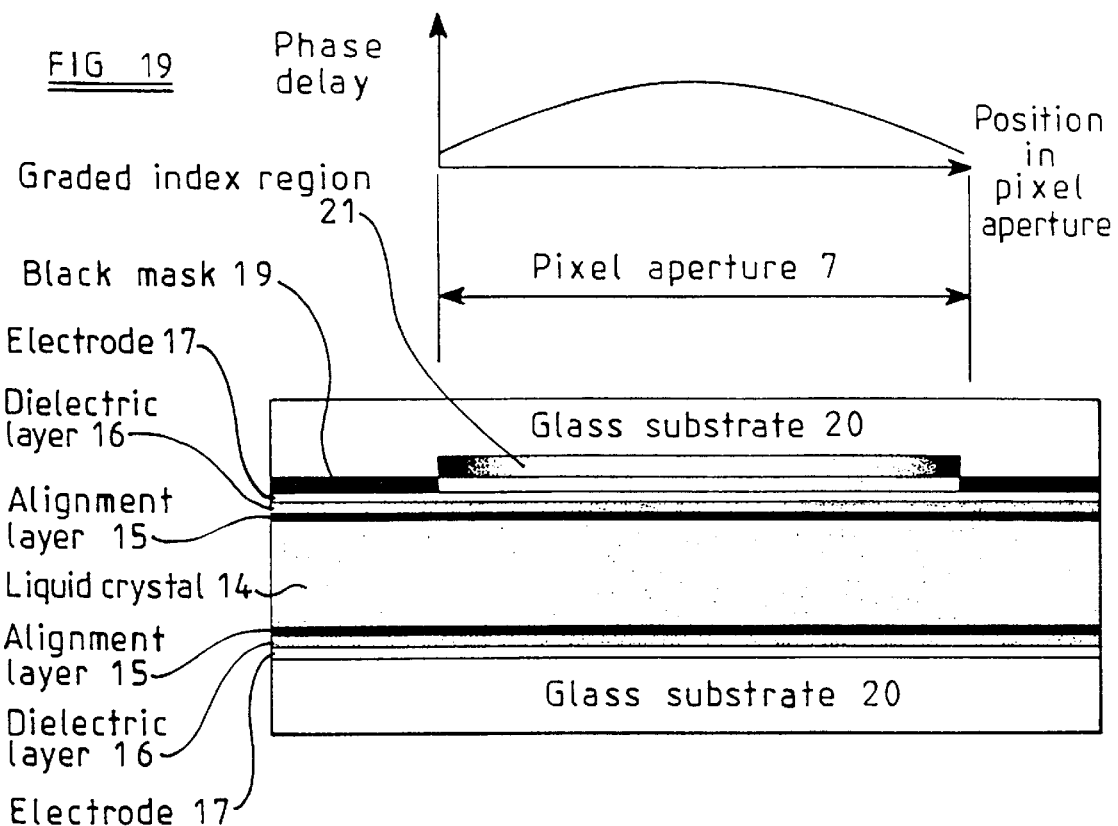
FIG 19
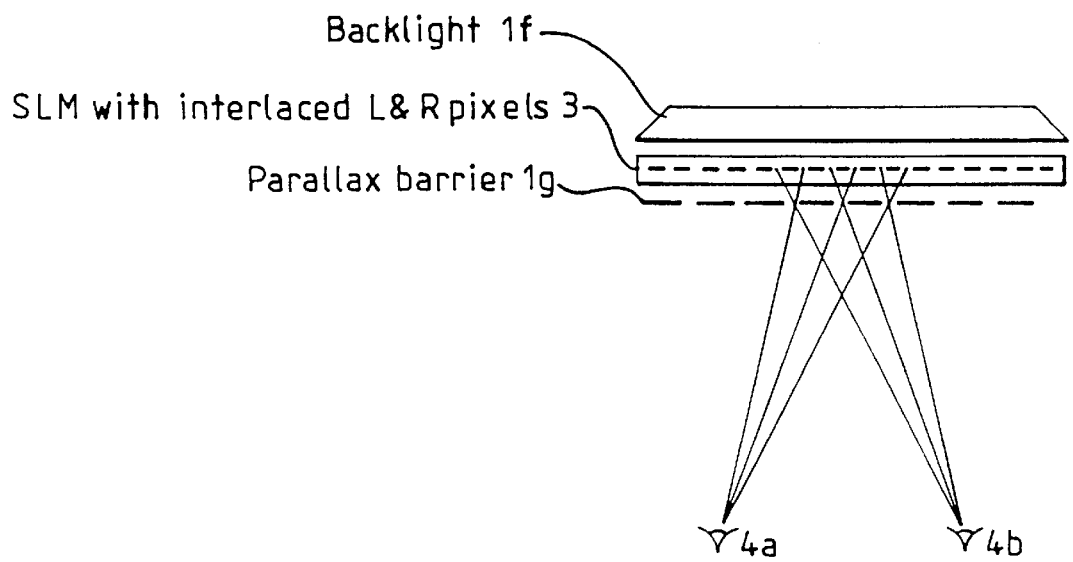
FIG 20 Front parallax barrier autostereoscopic display FIG 2.1
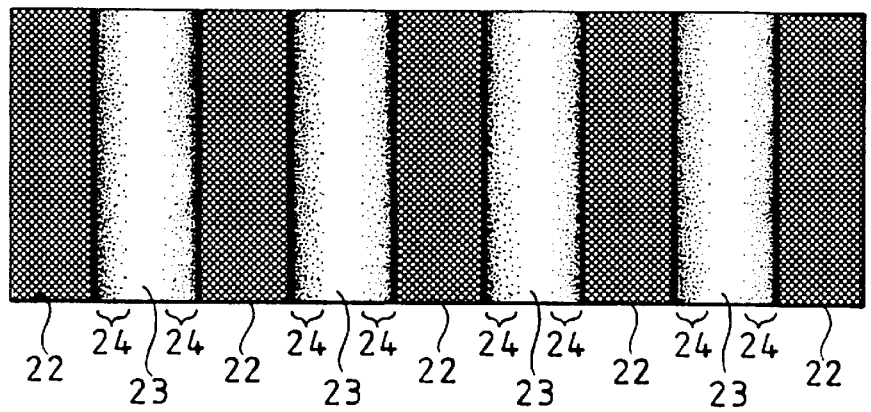
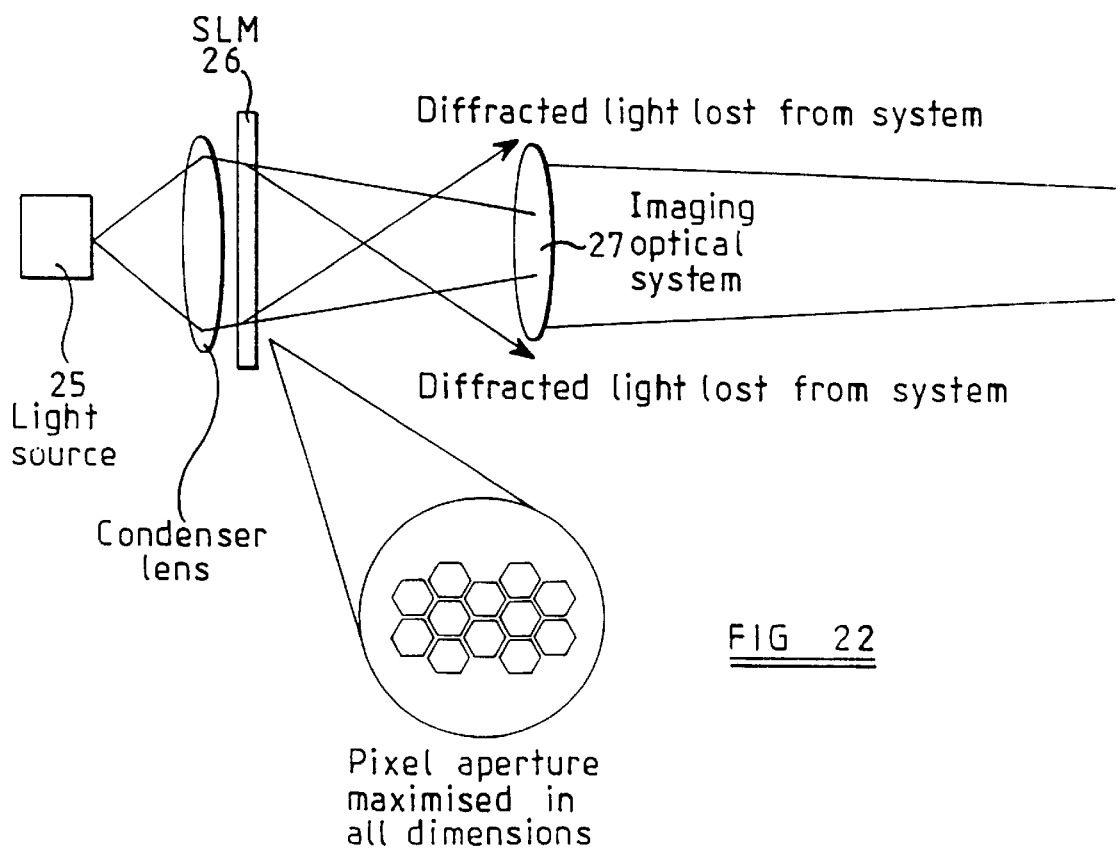
FIG 22

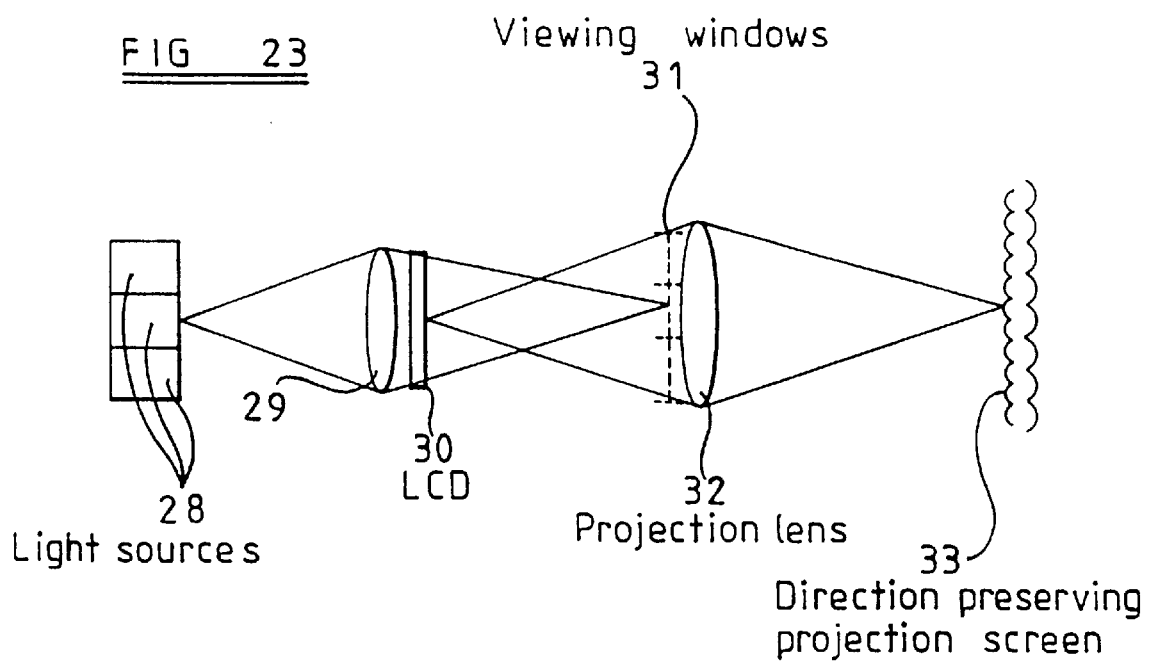
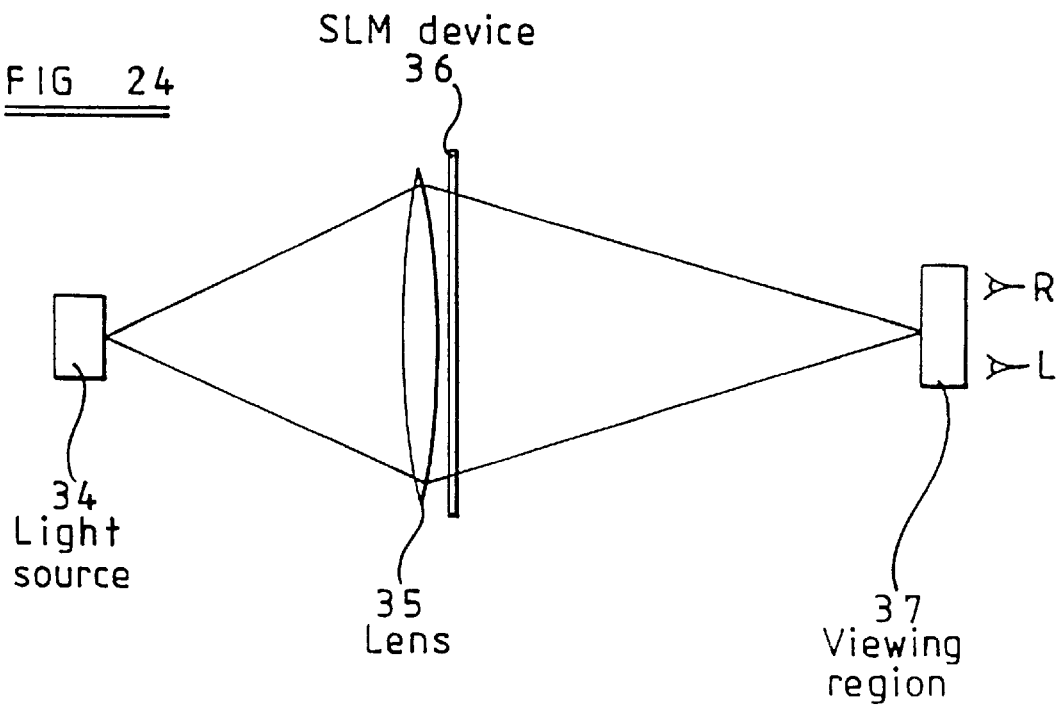

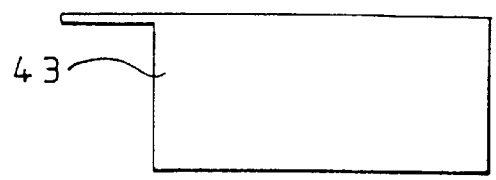
FIG 27
Combination 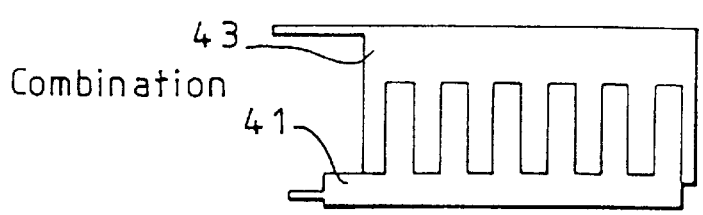
FIG 28 a
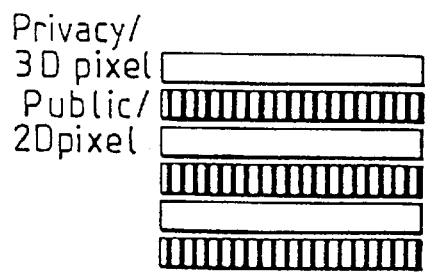
FIG 28 b
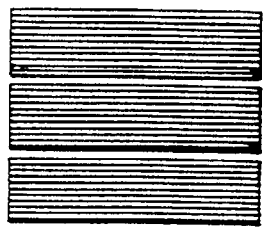 R This orientation:
G 3D/privacy at
90°: 2D public
B

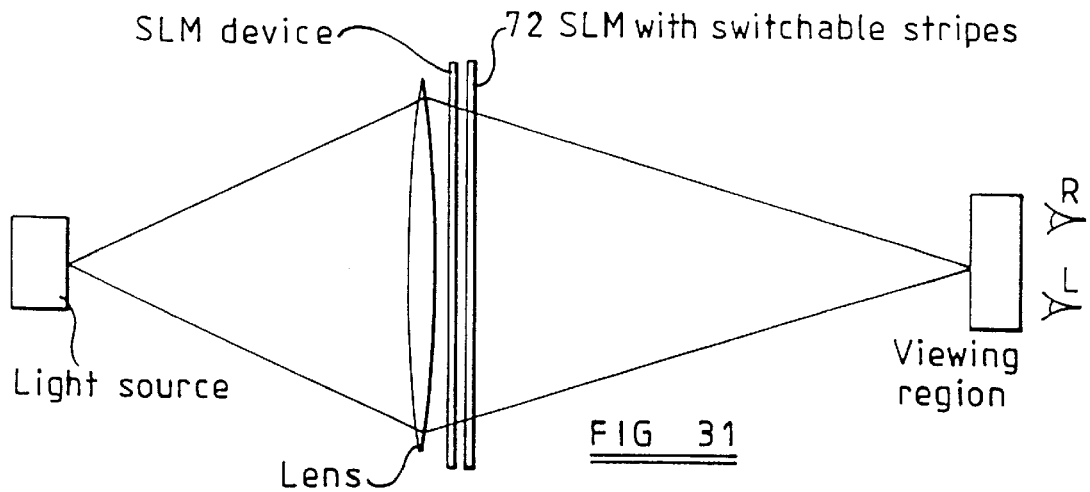
FIG 31
FIG 32 A set of pixel apertures with amplitude transmission profiles in both horizontal and vertical dimensions to minimise diffractive spreading in both directions
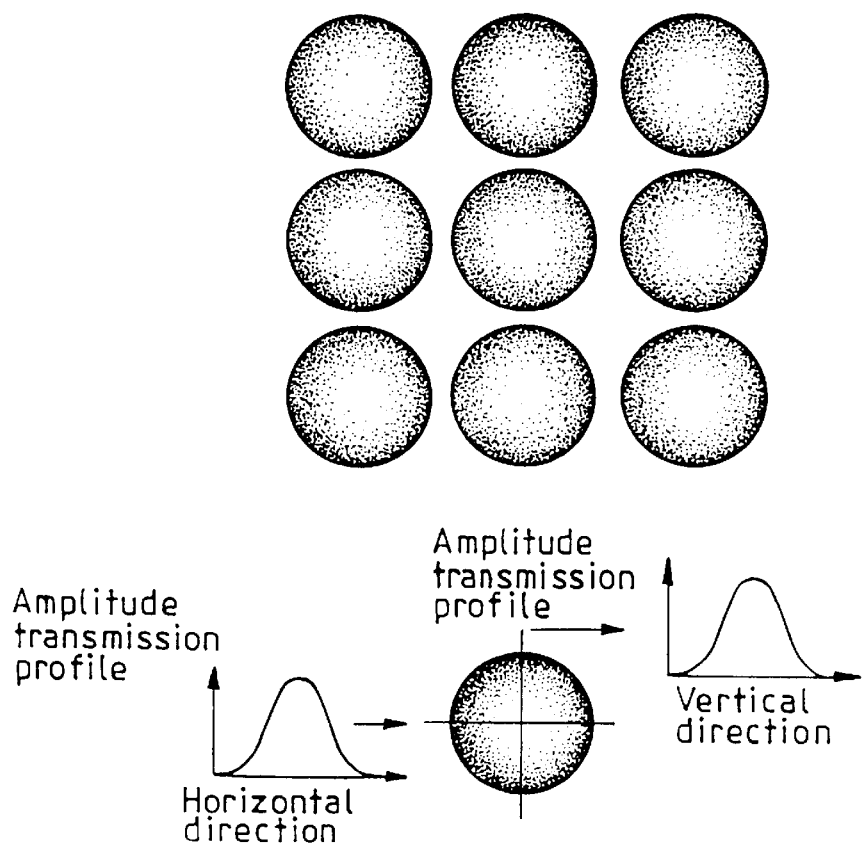

OPTICAL DEVICE AND DIRECTIONAL DISPLAY

This invention relates to an optical device suitable for use, for example, as a spatial light modulator (SLM) for use in a display device. The device is particularly suitable for use in an autostereoscopic three dimensional (3D) display device, but may alternatively be used in other types of device, The invention also relates to a directional display.

Autostereoscopic display devices are used in a number of applications, for example 3D television, 3D professional imaging, and 3D computer displays. Several types of autostereoscopic display are known, one type comprising a pair of light sources which are arranged to be illuminated alternately. The light sources are imaged by an optical system so as to form images viewable from two spaced viewing zones. An SLM is arranged to be illuminated by the light sources. The SLM is controlled so that when a first one of the light sources is illuminated, a first image intended to be viewed by an observer's left eye is displayed, a second image to be viewed by the observer's right eye being displayed when the second light source is illuminated. If an observer is located with his left eye in one of the viewing zones and his right eye in the other viewing zone, by displaying suitable images on the SLM, the observer will perceive a 3D autostereoscopic image.

An alternative type of autostereoscopic display device includes separate SLM's arranged to display the two images, the optical system including a beam combiner which is used to form images viewable, respectively, from two viewing zones.

If part of the image intended to be viewed by one of the observer's eyes is in fact viewed by the other of the observer's eyes, the observer may perceive a faint double image which may result in the observer suffering from eye strain or headaches. This effect is known as cross-talk and, in order to minimise cross-talk, it is desirable to provide a display device in which the viewing zones have clearly defined boundaries which do not overlap one another.

The SLM's commonly used in autostereoscopic display devices comprise liquid crystal displays having a plurality of individually controllable picture elements. Each picture element (pixels) acts, in use, as a small aperture through which light may be transmitted. The aperture size of each pixel is defined by a patterned mask layer in the SLM structure, commonly known as a black mask layer, which comprises a dark opaque mask provided with a pattern of small apertures, one aperture for each pixel. The function of the mask layer is to stop light from passing through the inactive regions of the SLM, restricting transmission to the active pixel areas. Some SLM devices include other opaque features, for example electrode conductor lines, which serve to define the pixel aperture area. Transmission through such small apertures results in diffraction. This diffraction causes the beams of light transmitted through the picture elements of the liquid crystal display to spread, and hence results in the boundaries of the viewing zones becoming blurred. Such blurring of the boundaries of the viewing zones causes cross-talk as illustrated in FIG. 1.

A number of techniques are known (G Toraldo di Francia, Nuovo Cim Suppl 9 426 (1952), G Boyer & M Sechaud, Appl Optics 12 893 (1973), B R Friedon, Optica Acta 16 795 (1969), B Boivin & A Boivin, Optica Acta 27 587 (1980)) which attempt to reduce the radius of the bright Airy disk at the centre of a diffraction pattern in order to gain an improvement in resolution, such techniques being used, for example, in the optical systems of telescopes. These techniques tend to result in the diffraction pattern including relatively bright higher order fringes. It is also known from B Dossier, P Boughon & P Jaquinot, Journ des Rech CNRS n11 (1950) to vary the transmission amplitude across the width of an aperture in order to avoid the formation of higher order diffraction fringes, the technique being used in the context of optical spectroscopy. In the field of liquid crystal displays, it is known from EP 0409188 to provide a diffraction grating in front of the liquid crystal display in order to blur the viewed edges of the picture elements of the liquid crystal display so that an observer does not perceive the grid structure of the picture elements.

According to a first aspect of the invention, there is provided an optical device comprising a plurality of picture elements, characterised in that each picture element has an aperture whose complex transmission properties, vary across the aperture so as to reduce light diffracted into at least one non-zero diffraction order and to increase light in the zero diffraction order, where the complex transmission properties comprise at least one of amplitude and phase transmission properties.

The complex transmission properties may vary in a lateral direction of the device. The amplitude transmission properties of each picture element may be varied in the lateral direction of the device by an absorbent and/or reflective means arranged to absorb and/or reflect light incident thereon, the absorbtion/reflection properties of the absorbent and/or reflection means varying in the lateral direction of the device.

The complex transmission properties of each aperture may be passive and fixed irrespective of the active state of the picture element. The absorbent and/or reflective means may comprise a patterned colour filter. As an alternative, the absorbent and/or reflective means may comprise a patterned black mask layer. The black mask layer may be patterned using a lithographic technique. As an alternative, the black mask layer may be of varying thickness.

The absorbent and/or reflective means may comprise a liquid crystal layer constituting the picture elements having varying amplitude transmission properties in the lateral direction of the device. The device may comprise an electrode spaced by a varying distance from the liquid crystal layer, a dielectric layer of varying thickness being provided between the electrode and the liquid crystal layer. As an alternative, each picture element may have a first electrode arranged to control the amplitude transmission of a first region of the picture element and a second electrode arranged to control the amplitude transmission of a second region of the picture element adjacent the first region.

The device may comprise phase variation means for varying the phase transmission across each picture element in the lateral direction of the device. The phase variation means may comprise a glass substrate including a region of graded refractive index.

The phase and/or amplitude transmission properties may vary continuously in the lateral direction of the device.

The picture elements may be shaped so as to produce diffraction in a direction other than the lateral direction of the device. The picture elements may be of diamond or rhombus shape.

The device may comprise diffraction inducing means for selectively inducing diffraction in the lateral direction of the device. The diffraction inducing means may comprise a liquid crystal layer arranged to be controlled by a first comb-like electrode to form substantially opaque lines in the liquid crystal layer The device may comprise a second comb-like electrode arranged to counteract the effect of the first comb-like electrode. As an alternative, the device may comprise a continuous electrode arranged to be used instead of the first comb-like electrode when diffraction in the lateral direction is to be minimised.

The device may comprise a first set of picture elements and a second set of picture elements, the second set of picture elements being provided with the diffraction inducing means in the form of a series of substantially opaque stripes.

The diffraction inducing means may comprise a panel provided with a series of substantially opaque stripes, the panel being rotatable between a position in which diffraction in the lateral direction of the device is minimised and a high diffraction position.

The diffraction inducing means may comprise a panel provided with stripes of photochromic material and a radiation source arranged to emit radiation of a wavelength to which the photochromic material is sensitive. The photochromic material may be sensitive to ultraviolet light.

The diffraction inducing means may comprise a spatial light modulator controllable to be substantially transparent or to display a plurality of substantially opaque stripes. The spatial light modulator may be a liquid crystal display.

The complex transmission properties may vary in a direction normal to the lateral direction of the device.

The device may comprise a spatial light modulator. As an alternative, the device may comprise a parallax barrier.

According to a second aspect of the invention, there is provided a directional display comprising a device according to the first aspect of the invention.

The display may be an autostereoscopic display.

By varying the phase and/or amplitude transmission properties of each picture element in the lateral direction of the device, diffraction in that direction can be reduced. Such a reduction in diffraction results in the production of clearer, better defined viewing zones which can be positioned so as to avoid, or minimise cross-talk. The improved definition of the viewing zones enables a greater area of each viewing zone to be used and, as a result, observer tracking systems can be simplified. Further, the reduction in angular spread of the light due to the reduction in diffraction enables the viewing zones to be located a greater distance from the optical device than is practical with existing arrangements. Moreover, the angular range over which the display can be steered is increased giving the observer greater freedom of movement whilst display flicker during such steering is reduced. The display size can also be increased. Where multiple observers can view the display, the greater viewing width enables more observers to view the display simultaneously.

The optical device may take the form of a liquid crystal display and have a black mask layer which is patterned so that the transmission properties of each picture element vary from a maximum in a middle region of each picture element to a minimum at an edge thereof. Alternatively, where colour filters are used in conjunction with the liquid crystal display, the optical density of the filters may be arranged to vary the transmission properties of each picture element in a lateral direction of the device.

In a further alternative, the liquid crystal display may be arranged such that the edges of the liquid crystal of each picture element are less transmissive than the central region thereof. In this alternative, any technique which is suitable for achieving grey scaling in a liquid crystal display device may be used.

According to a third aspect of the invention, there is provided a directional display comprising a display device for displaying an image which is visible in a predetermined viewing region, characterised by diffraction inducing means for selectively inducing diffraction so as to make the image visible outside the predetermined viewing region.

The diffraction inducing means may be arranged to induce diffraction in the lateral direction of the device.

The diffraction inducing means may comprise a liquid crystal layer of the display device arranged to be controlled by a first comb-like electrode to form substantially opaque lines in the liquid crystal layer. The display may comprise a second comb-like electrode arranged to counteract the effect of the first comb-like electrode. As an alternative, the device may comprise a continuous electrode arranged to be used instead of the first comb-like electrode when diffraction is to be minimised.

The display may comprise a first set of picture elements and a second set of picture elements, the second set of picture elements being provided with the diffraction inducing means in the form of a series of substantially opaque stripes.

The diffraction inducing means may comprise a series of substantially opaque stripes formed on the display device, the display device being rotatable between a position in which diffraction laterally of the display is minimised and a high diffraction position.

The diffraction inducing means may comprise a panel provided with stripes of photochromic material and a radiation source arranged to emit radiation of a wavelength to which the photochromic material is sensitive. The photochromic material may be sensitive to ultraviolet light.

The diffraction inducing means may comprise a spatial light modulator controllable to be substantially transparent or to display a plurality of substantially opaque stripes. The spatial light modulator may be a liquid crystal display.

It is thus possible to provide an arrangement which allows a directional display to be operated in an alternative mode in which the relatively restricted viewing region is extended For instance, in the case of an autostereoscopic display, the display may be operated normally to produce viewing regions or windows where an observer places his eyes in order to see a 3D image. In order to provide a 2D display with a larger viewing region, the diffraction inducing means induces diffraction so that light from the display spreads more widely and the display is visible from a much larger viewing region. Similarly, in the case of a directional display for providing private viewing by one observer in a restricted region, the diffraction inducing means may be used to operate the display in a non-private mode to allow more observers to see the display throughout a larger viewing region.

The invention further relates to an SLM and to an autostereoscopic device incorporating such an optical device.

The invention will further be described, by way of example, with reference to the accompanying drawings, in which:

FIGS. 1 to 8 illustrate conventional autostereoscopic display devices;

FIGS. 9a and 9b illustrate pixel arrangements suitable for use in the devices of FIGS. 1 to 8;

FIG. 10 is a view similar to FIG. 1 but omitting the SLM device in order to illustrate the diffractive effect of the conventional SLM device;

FIGS. 11a to 11j illustrate various shapes of transmission function and the associated intensity profiles;

FIGS. 15, 16a and 16b are views similar to FIG. 13 of alternative arrangements;

FIGS. 17, 18 and 19 are cross-sectional views of various modifications;

FIG. 20 illustrates an alternative type of display device;

FIG. 21 is a view of an embodiment suitable for use in the display device of FIG. 20;

FIG. 22 is a diagrammatic view of a conventional projection system in which the invention may be incorporated;

FIG. 23 is a view of a projection system in accordance with an embodiment of the invention;

FIG. 24 is a view of a directional 2D display;

FIGS. 26 and 27 are views of electrodes suitable for use in the SLM of FIG. 25;

FIGS. 28a and 28b are views illustrating techniques for switching between two operating modes;

FIGS. 30 and 31 are diagrammatic views of two alternative switchable display arrangements;

FIG. 32 is a diagrammatic illustration of picture elements having varying complex transmission functions in a vertical direction as well as in a lateral direction;

Figure 2:
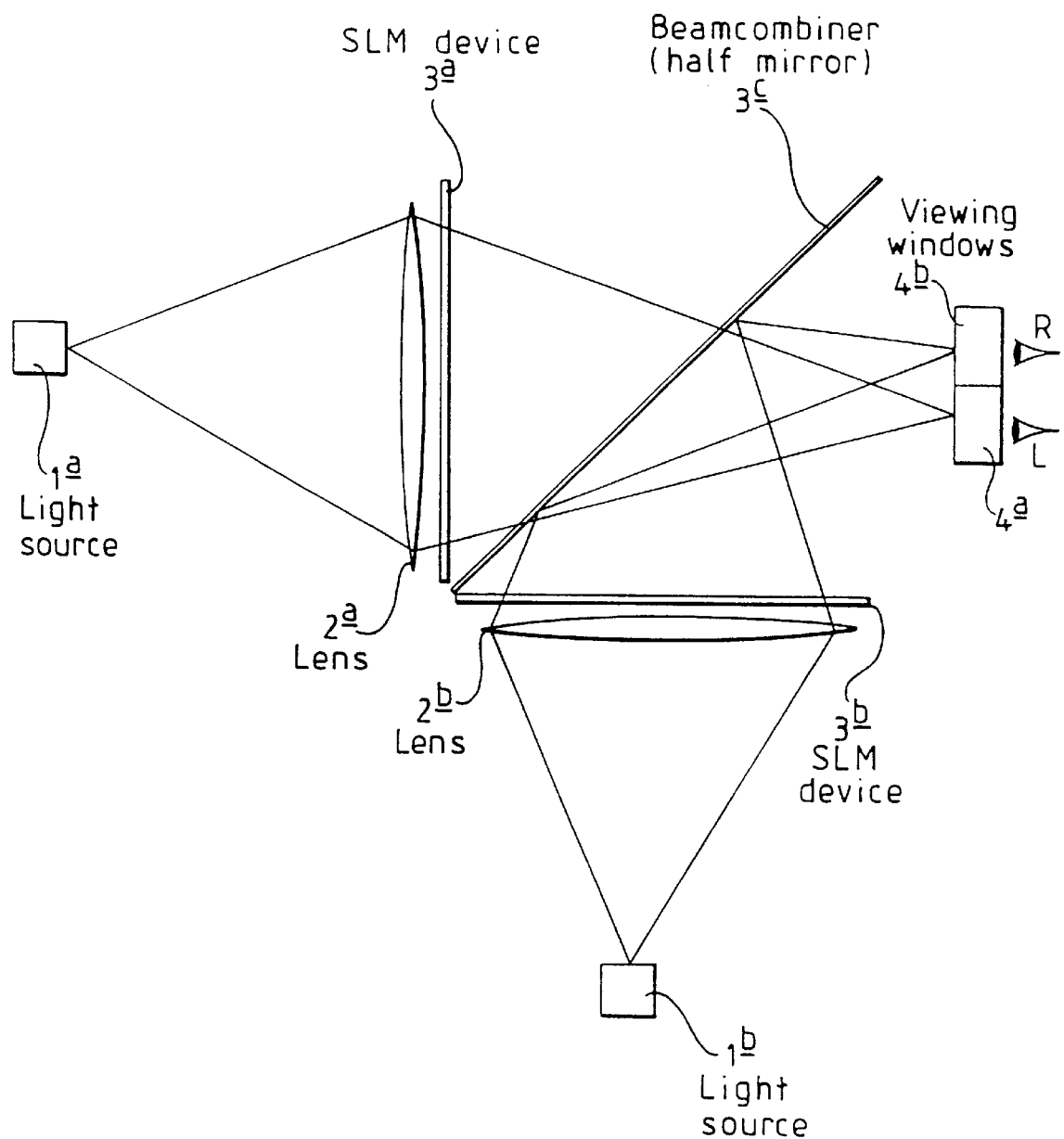

As described hereinbefore, the display device illustrated in FIG. 1 comprises a pair of light sources 1a, 1b which are arranged to illuminate a liquid crystal SLM device 3 through a lens 2 which is arranged so that images of the first and second light sources 1a, 1b are produced at first and second viewing windows or zones 4a, 4b. In use, an observer's left eye located in the first viewing zone 4a receives light from only the first light source 1a at the SLM device 3 across the whole width of the SLM device 3. Similarly, the observer's right eye located in the second viewing zone 4b receives light from only the second light source 1b at the SLM device 3 across the whole width thereof.

The SLM device 3 is arranged such that, when the first light source 1a is illuminated, an image is displayed on the SLM device 3 intended to be viewed by the observer's left eye and, when the second light source 1b is illuminated, the SLM device 3 displays an image intended to be viewed by the observer's right eye. By displaying appropriate images, the observer perceives a three dimensional autostereoscopic image.

Figure 3:
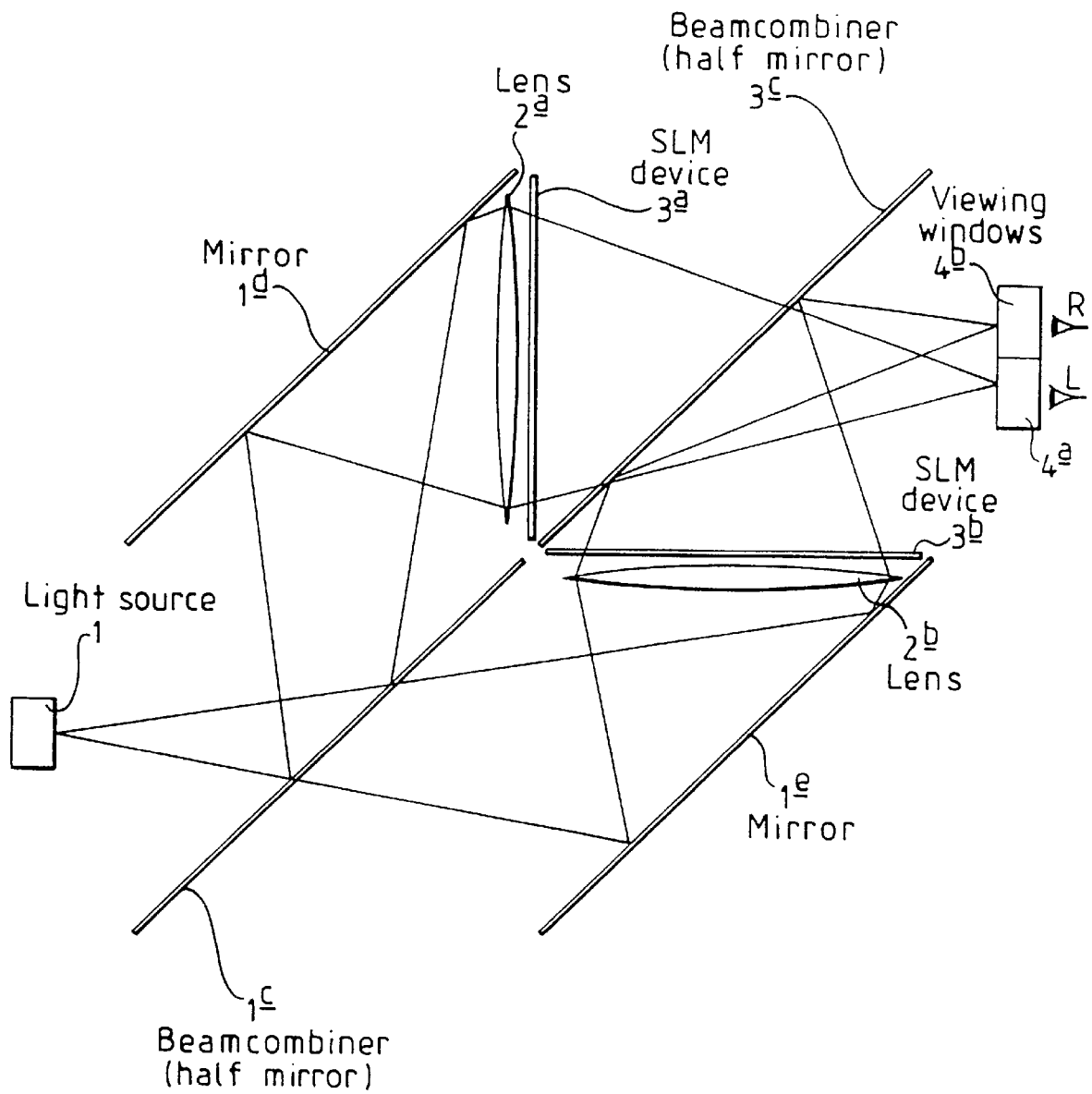

FIG. 2 illustrates an alternative type of autostereoscopic display, the light sources 1a, 1b being remote from one another and being imaged through respective lenses 2a, 2b, SLM devices 3a, 3b and a beam combiner 3c to be viewed from respective viewing windows or zones 4a, 4b. A further alternative is shown in FIG. 3, this alternative being similar to that of FIG. 2 with the exception that the light sources 1a, 1b are replaced by a single light source 1, a beam splitter 1c being arranged to split the light emitted by the light source 1 into a first part which is reflected by a mirror 1d to be incident upon the lens 2a and SLM device 3a, and a second part which is reflected by a mirror 1e to be incident upon lens 2b and SLM device 3b. The various components are oriented so that the images of the SLM devices 3a, 3b can be viewed from respective viewing zones 4a, 4b.

Figure 4:
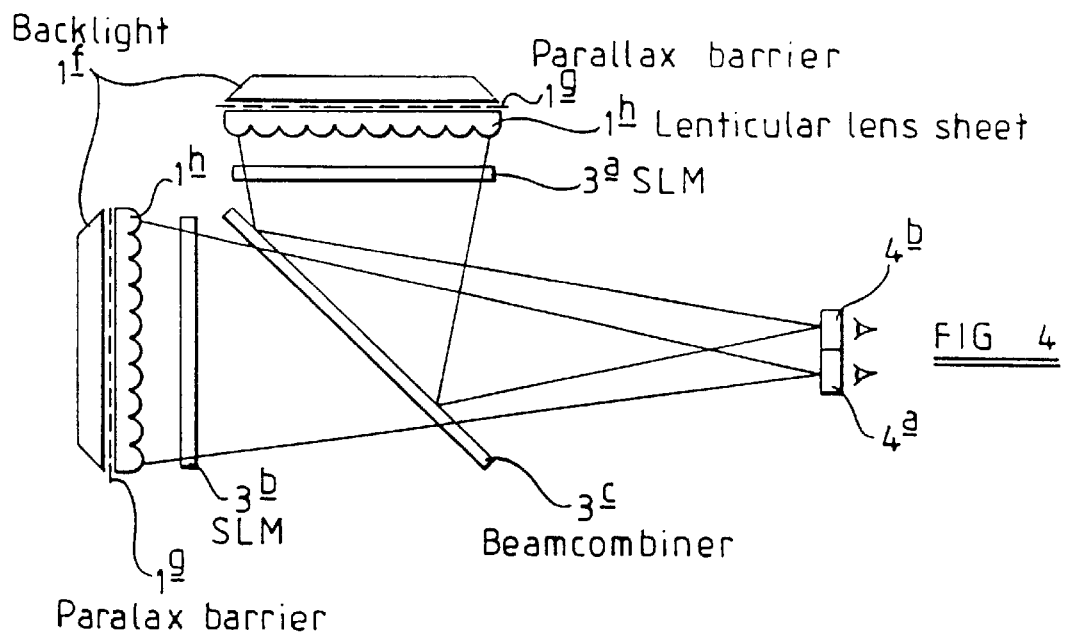

The arrangement illustrated in FIG. 4 is similar to that of FIG. 2, the individual light sources 1a, 1b and lenses 2a, 2b having been replaced by respective illuminators for the SLM devices 3a, 3b. The illuminators each comprise a backlight 1f, parallax barrier 1g and lenticular sheet 1h.

Each lenticule of the sheet 1h is aligned with a respective slit of the parallax barrier 1g so that light is imaged, after reflection by the beam combiner 3c, in the viewing zone 4b and the image displayed by the SLM 3a is visible only within the viewing zone 4b. Similarly, the slits of the parallax barrier 1g and the lenticules of the screen 1h associated with the SLM 3b are aligned such that the image displayed by the SLM 3b is visible only in the viewing zone 4a. The SLMs 3a and 3b display right and left eye images so as to provide autostereoscopic viewing when the viewer's eyes are located in the zones 4b and 4a, respectively.

Figure 5:
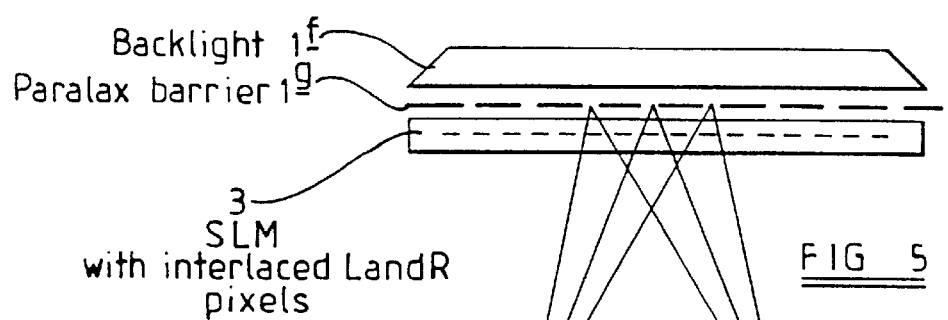

FIG. 5 illustrates an autostereoscopic display comprising a backlight 1f, a parallax barrier 1g and an SLM device 3 which is arranged to display an image consisting of a plurality of strips of the image intended for the observer's left eye interlaced with strips of the image intended for the observer's right eye. The periodicity of the strips of the SLM device 3 and parallax barrier 1f are such as to define one or more viewing zones 4a from which only the image intended for the observer's left eye can be viewed and one or more zones from which only the image intended for the observer's right eye can be viewed.

Figure 6:
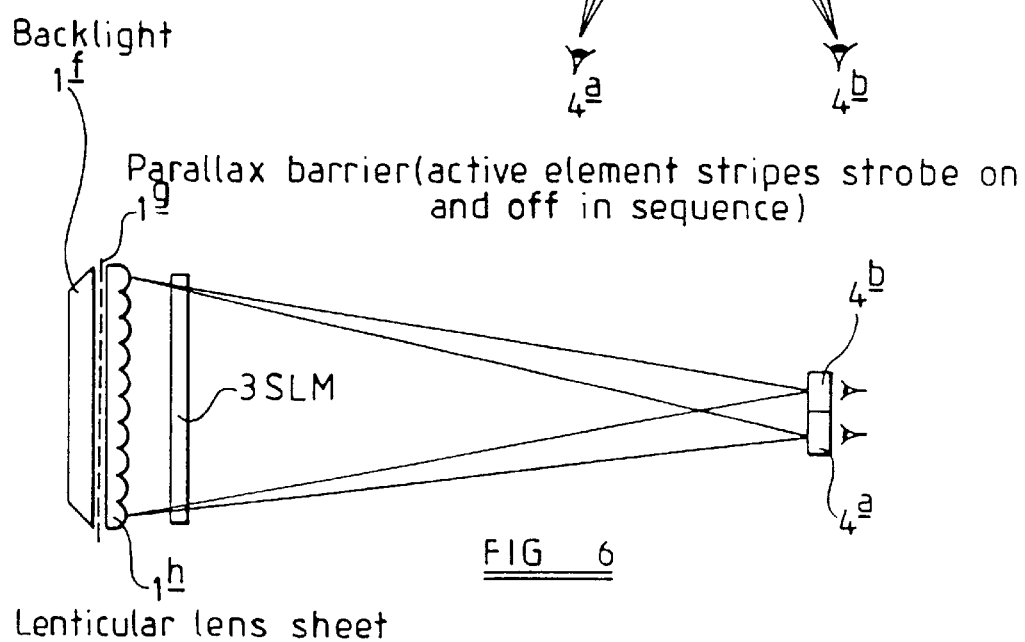

FIG. 6 illustrates a time-multiplexed arrangement similar to that of FIG. 1 but in which the light sources 1a, 1b are replaced by a backlight 1f, parallax barrier 1g and lenticular screen 1h. The parallax barrier 1g is active, for example in the form of a liquid crystal type SLM, and is arranged to display a plurality of opaque stripes. The barrier 1g is controllable to permit the stripes to be moved with respect to the lenticular screen 1h between a position in which the image of the SLM device 3 can be viewed from a first viewing zone 4a and a position in which the image can be viewed from a second viewing zone. In particular, during display by the SLM 3 of the first of a stereoscopic pair of images, the parallax barrier 1g is controlled to provide a respective transparent slit aligned with each lenticule of the sheet 1h so that light from the backlight 1f is imaged in the viewing zone 4a. When the other image of the stereoscopic pair is displayed by the SLM 3, the previous slits are made opaque and new transmissive slits are formed and cooperate with the lenticules to image light from the backlight 1f to the viewing zone 4b.

Figure 7:
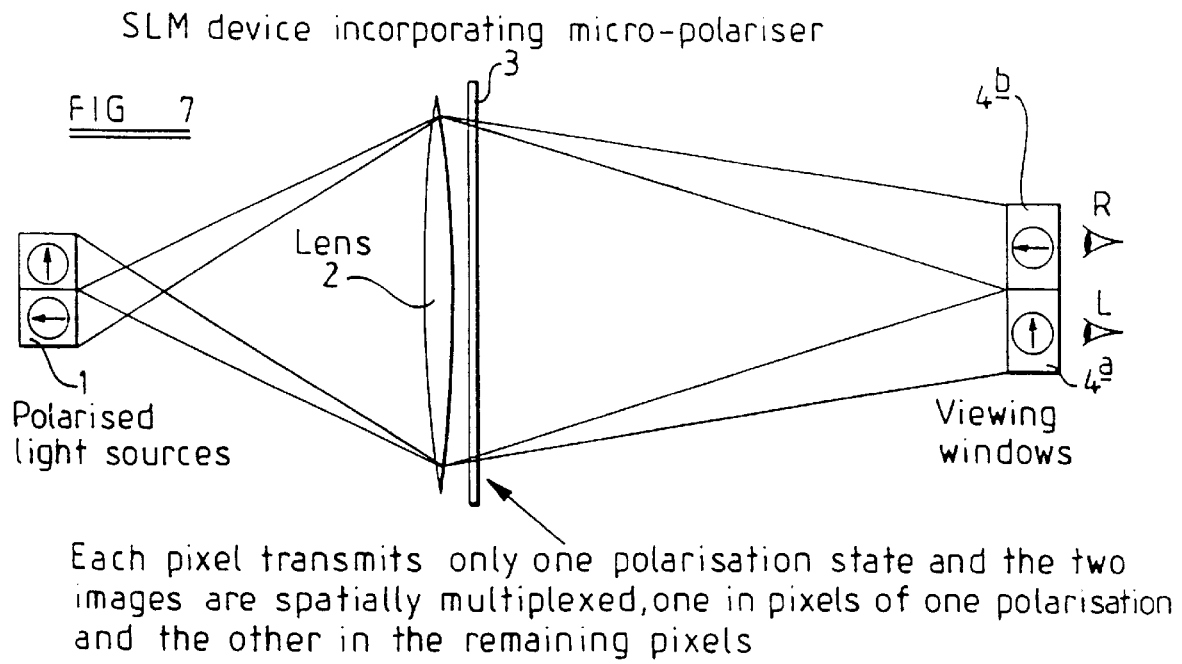

FIG. 7 illustrates an arrangement similar to FIG. 1 but in which the light sources 1a, 1b are both switched on continuously, one of the light sources emitting light of a first polarisation whilst the other light source emits light of a second orthogonal polarisation, for example by using appropriately oriented polarising filters. The SLM device 3 includes a first set of pixels which transmit the first polarisation, these pixels displaying an image intended for one of the observer's eyes, and a second set of pixels which transmit the second polarisation, these pixels being controlled to display an image intended for the observer's other eye.

Figure 8:
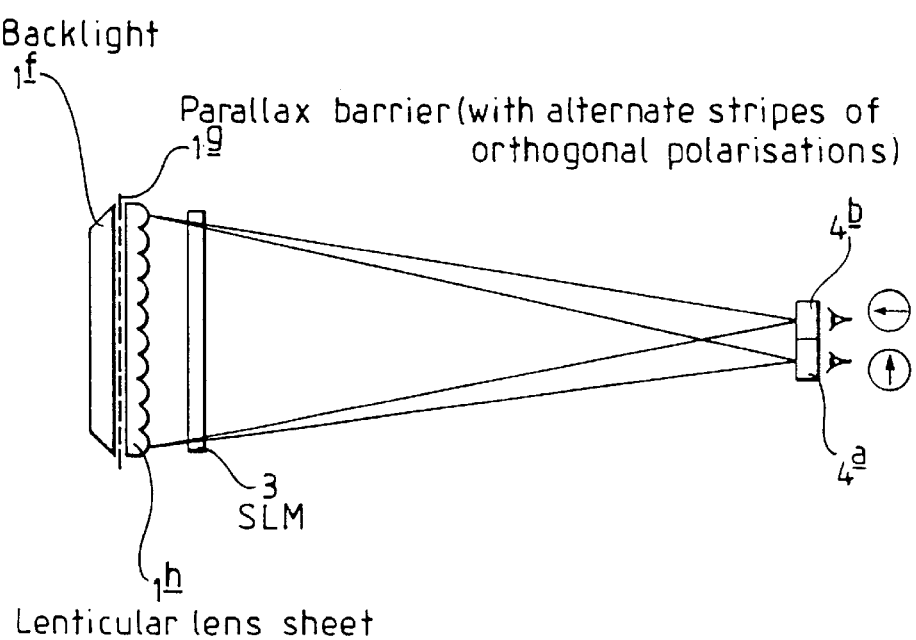

The arrangement illustrated in FIG. 8 is equivalent to that of FIG. 6 but uses different polarisations instead of time-multiplexing, the parallax barrier 1g including regions which transmit light of the first polarisation and regions which transmit light of the second orthogonal polarisation instead of having opaque stripes.

In the arrangements illustrated in FIGS. 7 and 8, cross-talk between the two images may be further lowered by using appropriately polarised viewing spectacles, although the use of such spectacles is not essential and the display can be viewed without using such spectacles.

FIG. 9a shows an example of the pixel arrangement of a conventional liquid crystal display for use in the SLM device 3. The pixels 5 of the liquid crystal display are shaped so as to maximise the useable area of the liquid crystal material, the unused areas of the liquid crystal material being covered by a black mask layer. The pixels 5 are of relatively small width, the maximum width of each pixel 5 typically being 50 to 100 μm. The shape of the pixels is such that they include regions of width 3 to 30 μm which induce diffraction which as illustrated in FIG. 1 causes blurring of the edges of the viewing zones 4a, 4b and hence may result in cross-talk. In addition to the shape of the pixels causing such diffraction, the pixels may include opaque lines or other opaque features which cause further diffraction. Furthermore, the pixels may contain refractive index features, for example due to patterning of various layers within the device. Such refractive index features cause variations in the phase transmission properties of the pixel and hence give rise to increased diffraction.

FIG. 10 illustrates that, if the diffracting element, ie the SLM device 3, is omitted, the definition of the viewing zones 4a, 4b is improved, there being less overlap between the viewing zones 4a, 4b. Any remaining overlap is caused by the use of an imperfect optical system. Such an improvement is advantageous, and hence it is advantageous to reduce the amount of diffraction caused by the SLM device 3.

FIG. 9b illustrates a liquid crystal display suitable for use in the SLM device 3 in which the level of diffraction in the horizontal direction is reduced by using pixels 6 of relatively great width, the pixels 6 illustrated in FIG. 9b being of width approximately 300 μm and height approximately 55 μm. The increase in the width dimension of the pixels 6 reduces the amount of spreading of light in the width direction induced due to the diffraction effect of the pixels. The viewing zones 4a, 4b which are achieved using an SLM device 3 including the pixels 6 of FIG. 9b are therefore better defined than is the case where the pixels of FIG. 9a are used. Thus cross-talk can be reduced and the other advantages described hereinbefore may be attained.

FIG. 11a illustrates the transmission function typical of the pixels 5, 6 illustrated in FIG. 9 and in most SLM's. As indicated in FIG. 11a, the amplitude transmission of each pixel is substantially uniform across its complete width and falls sharply to zero at its edges. The diffraction pattern which results from using such pixels 5, 6 is represented by FIG. 11b which indicates that a plurality of fringes are produced at positions spaced from the main bright spot at the centre of the diffraction pattern which, in use, may spread into an adjacent viewing zone from which the image intended for the observer's other eye is to be viewed. FIGS. 11c to 11j illustrate the effect of varying the pixels transmission function across its width, and the corresponding changes to the diffraction pattern, each of the diffraction patterns for the various shapes of transmission function illustrating, in broken lines, the diffraction pattern caused by the square transmission function illustrated in FIG. 11a.

FIG. 11c illustrates a cosine pixel aperture transmission function and FIG. 11d illustrates the corresponding diffracted spot intensity profile. The main bright spot is broader than for the square transmission function of FIG. 11a and the fringes are of substantially reduced intensity, only the first fringe being visible with the scale of FIG. 11d.

The linear sloped function shown in FIG. 11e gives rise to the profile shown in FIG. 11f and represents an improvement over the profile of FIG. 11d in that the fringes are of even lower intensity.

FIG. 11g illustrates a flat-topped gaussian edged transmission function having the profile shown in FIG. 11h. The main bright spot is again wider than for the square function of FIG. 11a and the fringes are of reduced intensity and spaced further away from the centre of the bright spot. Such a profile gives better light throughput than those of FIGS. 11c or 11e.

FIG. 11i illustrates a truncated gaussian transmission function and FIG. 11j illustrates the corresponding diffracted spot intensity profile. Again, the main bright spot is wider and the fringes are of greatly reduced intensity, being effectively invisible on the intensity scale used in FIG. 11j.

Clearly, by using an aperture transmission function other than the square function illustrated in FIG. 11a, reductions in the intensity of the fringes spaced from the central bright fringe of the diffraction pattern can be achieved.

Figure 12:
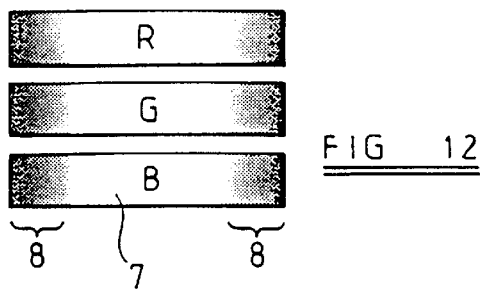
FIG. 12 illustrates a pixel in accordance with an embodiment of the present invention.

FIG. 12 illustrates three pixels 7 which have been modified so as to include, adjacent their side edges, regions 8 of reduced transmission. The variations in the depth of shading of the pixels 7 illustrated in FIG. 12 denote, that over a central region of each pixel 7, maximum transmission occurs, the level of transmission gradually falling towards the side edges of the pixels 7 to a minimum at the edges thereof. The variations in transmission may be achieved using a number of different techniques.

Figure 13:
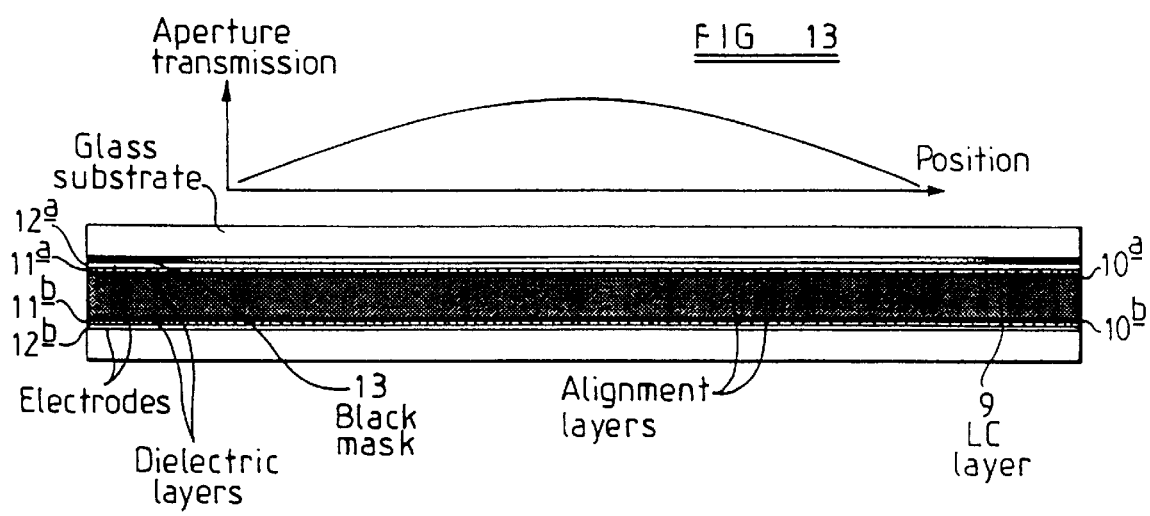
FIG. 13 is a cross-sectional view of the pixel of FIG. 12.

FIG. 13 illustrates an SLM device 3 comprising a liquid crystal layer 9 which is located between a pair of alignment layers 10a, 10b, dielectric layers 11a, 11b and electrodes 12a, 12b. A black mask layer 13 is applied to the inside face of a glass substrate, the black mask layer 13 being patterned so as to define a plurality of pixels each of which is individually controllable by applying suitable electric fields thereto using the electrodes 12a, 12b.

In this arrangement, the dielectric layers 11a, 11b are of substantially uniform thickness, and thus the electrodes 12a, 12b are substantially equally spaced from the liquid crystal layer 9 across its complete width. In order to achieve the variations in transmission across the width of each pixel, the black mask layer 13 is patterned so as to include regions of substantially zero transmission at the edges of the pixel, the black mask layer 13 extending partway across each pixel and being patterned to permit some transmission therethrough, the amount of transmission gradually increasing toward the centre of the pixel so that the pixel includes a central region of maximum transmission.

The patterning of the black mask layer 13 may be achieved using a suitable lithographic process. Alternatively, for example, where the black mask layer 13 is composed of chrome, the variations in transmission properties may be achieved by varying the thickness of the chrome layer to include thick regions where the transmission is to be minimum and thinner regions where some transmission is required.

Figure 14:
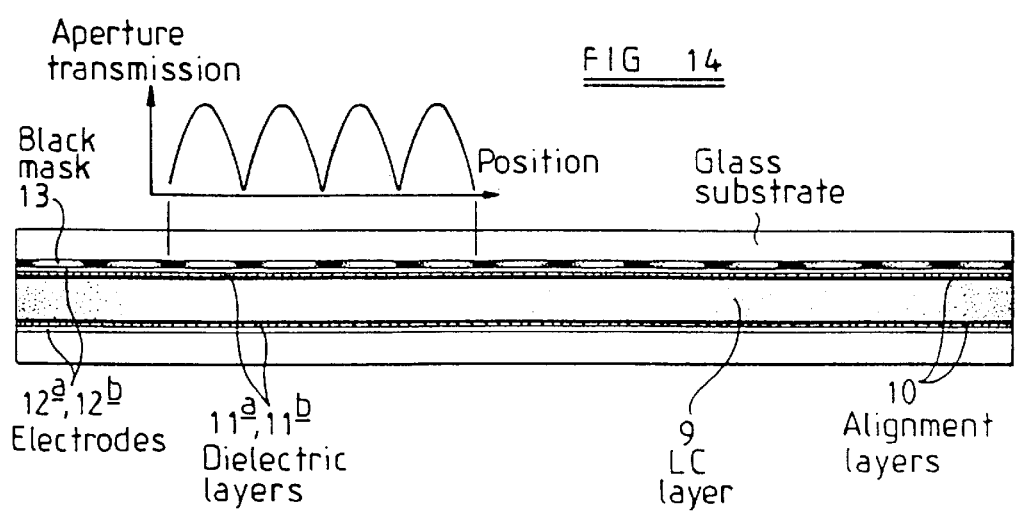
FIG. 14 is a cross-sectional view of an SLM comprising a plurality of picture elements of the type illustrated in FIG. 13.

FIG. 14 illustrates that the variations in transmission function could be designed to occur across the complete width of the SLM device 3, the variations being substantially continuous. Such linking of the transmission variations further reduces the formation of higher order fringes. Where the transmission function takes a sine-squared form, a single off-axis bright fringe is formed and, provided the angle of this fringe is well away from the adjacent viewing zone, the formation of such a fringe does not result in cross-talk. For a display with a viewing distance of 700 mm intended for use by an observer having an interocular separation of 65 mm, the pixel pattern would require a feature size approximately 6 μm for strong cross-talk to occur. The typical feature size of the pixels of an LCD is of the order of 60 μm or more, so strong cross-talk is avoided.

Clearly, the presence of an arrangement for varying the transmission results in some absorption of light, and hence in a reduction in display brightness. It is therefore necessary to balance the improvements in definition of the viewing windows against the reduction in display brightness when selecting the transmission properties for an LCD.

The pixel 7 illustrated in FIG. 15 comprises a liquid crystal layer 9 which extends across the complete SLM, the layer 9 being located between alignment layers 10, dielectric layers 11a, 11b and electrodes 12a, 12b. A conventional black mask layer 13 including a plurality of pixel apertures is applied to the electrode 12a, the black mask layer 13 and electrodes 12a, 12b defining a grid-like structure of pixels. The dielectric layer 11b is of substantially uniform thickness so that the electrode 12b is spaced by a substantially constant distance from the liquid crystal material 9. However, the dielectric layer 11a is of non-uniform thickness, the thickness of the dielectric layer 11a being greatest beneath the material of the black mask layer 13 and gradually falling to a minimum within each pixel aperture of the black mask layer 13. The electrode 12a is applied directly to the dielectric layer 11a, so that the electrode 12a is spaced from the liquid crystal material 9 by a greater distance beneath the black mask layer 13 than in the centre of each pixel 7.

Where the liquid crystal display is of the normally black type, the application of an electric field by the electrodes 12a, 12b across the liquid crystal material 9 reorientates the molecules of the liquid crystal material 9 to switch the liquid crystal material 9 to its white mode. However, the non-uniform spacing of the electrode 12a from the liquid crystal material 9 reduces the magnitude of the electric field applied to the parts of the liquid crystal material 9 located adjacent the edges of the aperture of the black mask layer 13. Thus by controlling the electrodes 12a, 12b appropriately, a condition can be achieved in which the centre part of the pixel 7 is in its white mode whereas the parts of the liquid crystal material 9 beneath the part of the dielectric layer 11a of intermediate thickness permit transmission of an intermediate amount of light. These parts are thus seen as a grey area which is darker adjacent the pixel edges than towards the central region of the pixel. As the dielectric layer 11a varies smoothly from maximum thickness to minimum thickness, the transmission function of the liquid crystal material 9 varies smoothly from maximum where the dielectric layer 11a is of minimum thickness to a minimum where the dielectric layer 11a is of maximum thickness.

Glass substrates are provided between which the electrode, dielectric layers, alignment layers, liquid crystal material and black mask layer are sandwiched to support the various layers forming the LCD.

Figure 16:
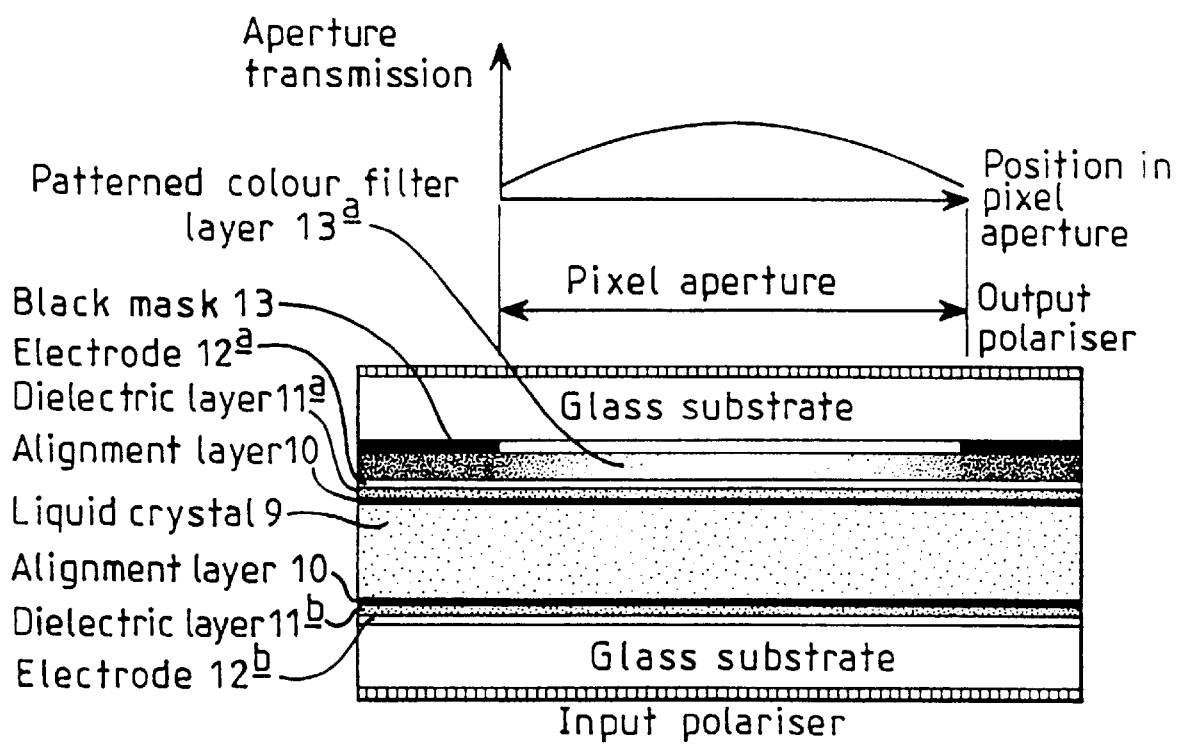

In the arrangement illustrated in FIG. 16a, separate electrodes are provided to control the operation of the central region of each pixel and the edge regions thereof. A first electrode 50 is used to control the operation of the central region of the pixel, second electrodes 51 being used to control the operation of the edges thereof, insulating layers 52 being located between the electrodes 50, 51. Additional electrodes may be used to produce smoother variations in the grey levels formed in the liquid crystal material.

In an alternative arrangement illustrated in FIG. 16b, the black mask layer 13 takes the conventional form illustrated in FIG. 15, and the electrodes 12a, 12b are uniformly spaced from the liquid crystal material 9, a colour filter layer 13a being provided between the black mask layer 13 and electrode 12a in order to provide a colour display. The colour filter layer 13a is patterned so as to include regions adjacent the centres of the pixels in which maximum transmission occurs, the transmission gradually falling to a minimum adjacent the edges of the black mask layer 13.

In each of the embodiments described hereinbefore, the reduction in diffraction is achieved by varying the complex transmission function across the width of each pixel. The complex transmission function includes both the amplitude transmission properties and the phase transmission properties, and in the examples described hereinbefore it is the amplitude transmission properties which are varied. However, the reduction in diffraction can be achieved by varying either or both of the amplitude and phase transmission properties.

The arrangement illustrated in FIG. 17 comprises a liquid crystal layer 14 which is sandwiched between a pair of alignment layers 15, a pair of dielectric layers 16 and a pair of electrodes 17 such that the electrodes 17 are uniformly spaced from the liquid crystal layer 14. A phase delay layer 18 is located adjacent one of the electrodes 17, the phase delay layer 18 being patterned so as to have a varying effect on the phase of light transmitted through the pixel. A conventional black mask layer 19 is located adjacent the phase delay layer 18. As illustrated in FIG. 17, glass substrates 20 are provided to support each of the layers of the device as described hereinbefore.

The phase delay layer 18 may be a reactive mesogen material which can be patterned by serial steps in a lithographic process. This material is birefringent so the light incident thereon must be linearly polarised at a defined angle with respect to the material. Therefore an output polariser 18a would be incorporated into the LCD device after the LC layer 9 and before the phase delay layer 18. This alternative in shown in FIG. 18.

FIG. 19 illustrates an embodiment which is similar to FIG. 17 but in which the phase delay layer 18 is omitted, one of the glass substrates 20 being modified so as to include a region 21 of graded refractive index, the region 21 having the same effect as the phase delay layer 18 of the embodiment of FIG. 17. The region 21 may be fabricated by a known ion diffusion technique into glass, such a technique currently being used to fabricate graded refractive index (GRIN) lenses.

An alternative type of conventional autostereoscopic display device as shown in FIG. 20 includes an SLM 3 arranged to display an image which comprises the image intended for the left eye of the observer split into a plurality of vertically extending stripes which are interlaced between similar stripes of the image intended to be viewed by the observer's right eye. In this display device, a parallax barrier 1g is provided between the SLM 3 and the observer, the parallax barrier 1g being positioned so as to substantially prevent the view intended for the observer's right eye being viewed by his left eye and vice versa. In addition to any diffraction caused by the SLM 3, such an autostereoscopic device suffers from similar disadvantages due to diffraction caused by the parallax barrier 1g which may be reduced by adjusting the parallax barrier so as to include regions of varying transmission adjacent the edges of the opaque parts thereof as illustrated in FIG. 21 in which the opaque parts of the parallax barrier are by the reference numeral 22, the high transmission parts denoted by numeral 23, and the regions of varying transmission by reference numeral 24. The variations in transmission may be achieved in the parallax barrier using any one of the techniques described hereinbefore in relation to the individual pixels of a liquid crystal display.

Although the description given hereinbefore relates to the use of the optical device in direct view autostereoscopic devices, it will be recognised that the optical device could be used in a number of different applications. For example, FIG. 22 illustrates a projection type liquid crystal display system in which light from a light source 25 passes through an SLM device 26 and is projected through a suitable imaging optical system 27. The diffraction caused by the conventional SLM device 26 results in some of the light transmitted thereby being diffracted to such an extent that it is not incident upon the aperture of the imaging optical system 27. This light is therefore lost from the system. By using hexagonal or circular pixels, light loss caused by diffraction can be reduced.

If the SLM 26 is replaced by an SLM including the optical device of the present application with a complex transmission function across each pixel, the level of diffraction occurring in the SLM is further reduced. Thus there is a reduction in the quantity of light lost from the system, more of the light transmitted by the SLM being incident on and transmitted through the imaging optical system 27. The application of the optical device of the present application to liquid crystal projection type systems is not limited to the type of system described with reference to FIG. 22, and is equally applicable to the arrangement illustrated in FIG. 23 which is a three dimensional autostereoscopic projection display comprising a plurality of light sources 28 which are imaged through lens 29 and liquid crystal type SLM 30 to viewing windows 31 which are located substantially at the aperture of a projection lens 32 arranged to focus the image onto a direction preserving projection screen 33. Such a projector not only has improved optical efficiency, but also has improved quality viewing windows with relatively low levels of cross-talk.

FIG. 24 illustrates a two dimensional directional display arranged to restrict the viewing zone so that only one observer can observe the image displayed by the SLM. Such a display is often described as a 'Privacy Display' and is particularly suitable for use where sensitive or confidential information is to be displayed. The display device comprises a light source 34 which is imaged through a lens 35 and SLM device 36 to form a viewing region 37 from which an image displayed on the SLM display can be viewed. As with the embodiments described hereinbefore, diffraction of light by the SLM device 36 results in a blurring of the boundaries of the viewing region 37 and thus can be regarded as increasing the width of the viewing region 37. The use of the optical device of the present invention in the SLM device 36 reduces such diffraction, and hence improves the security of the display.

Figure 25:
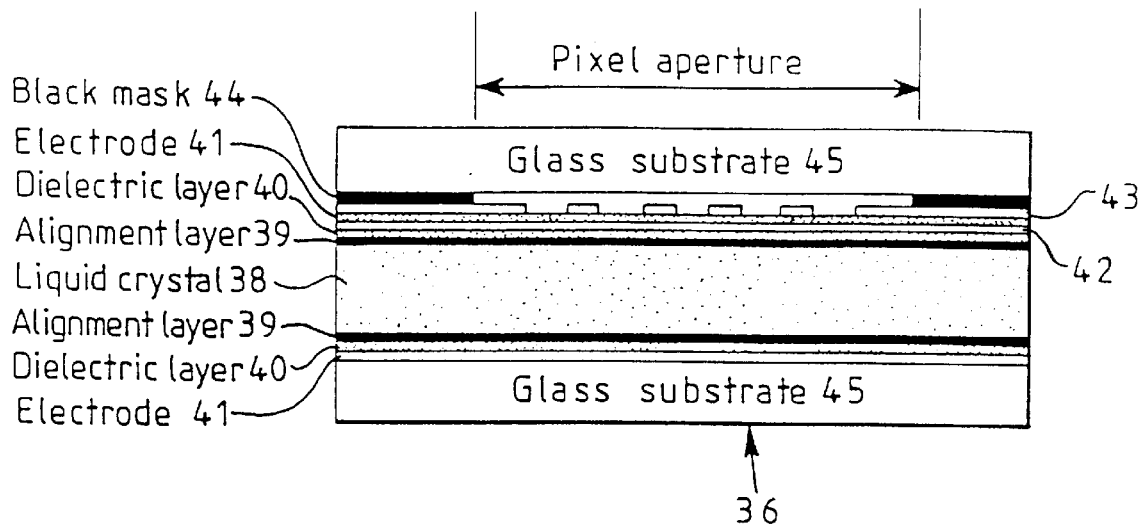
FIG. 25 is a cross-sectional view of part of an SLM for use in the display of FIG. 24.

In some circumstances, it may be necessary to be able to switch the display device illustrated in FIG. 24 between a condition in which it operates as a privacy display as illustrated in FIG. 24 and a condition in which the viewing region 37 is substantially increased so as to permit more than one person to view the image displayed by the SLM device 36, or to switch a device similar to that of any one of FIGS. 1 to 8 between a 3D autostereoscopic mode and a 2D wide viewing angle mode. Such an arrangement may be achieved by using the SLM device 36 part of which is illustrated in FIG. 25. The SLM device of FIG. 25 comprises a liquid crystal layer 38 which is sandwiched between a pair of alignment layers 39, dielectric layers 40 and electrodes 41. Although not illustrated, each pixel of the SLM 36 is provided with means to vary the phase or amplitude transmission across the width of the pixel aperture in order to reduce diffraction caused by that pixel using any of the techniques described hereinbefore.

The upper electrode 41 is provided with an additional dielectric layer 42, and a further electrode 43 is provided on the dielectric layer 42. A conventional black mask layer 44 is provided on the additional electrode 43, the combination of black mask, electrodes, dielectric layer, alignment layers and liquid crystal being located between and supported by two glass substrates 45.

Figure 26:
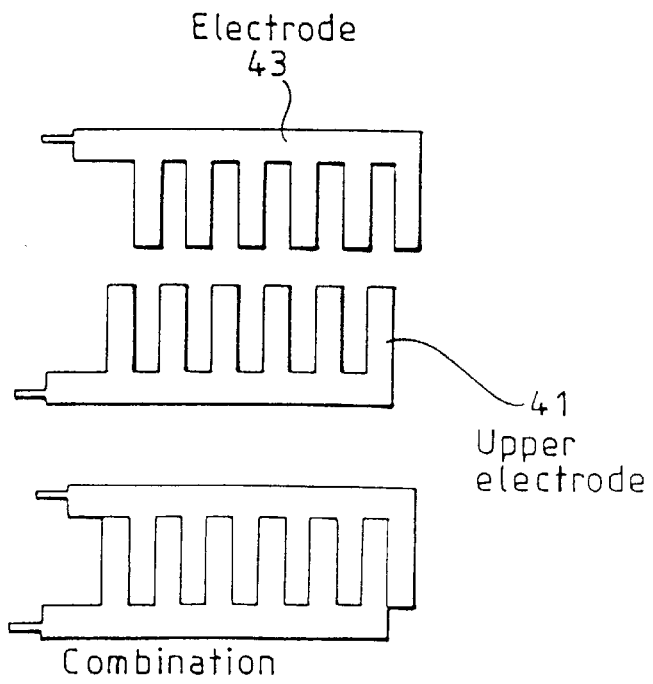

The upper electrodes 41 and 43 are shaped as illustrated in FIG. 26 so as to take the form of two complimentary interdigitated or comb-like electrodes. In use, where the display is intended to be viewed by a single observer or in 3D mode, both electrodes 41 and 43 are used. However, where a normally black-mode display is intended to be viewed simultaneously by two or more observers in 2D mode the upper electrode 43 is switched off so that only the electrode 41 is used. In these circumstances, stripes of the liquid crystal material 38 exist which are subject to a relatively low electrical field compared to the remainder thereof, and the result is that the liquid crystal material 38 includes stripes which are opaque, and stripes which may be substantially transparent which are used to display the desired image. The existence of the narrow, opaque stripes results in an increase in diffraction occurring within the SLM device 36 so that light transmitted by the SLM device is spread over a relatively wide area enabling a plurality of observers to observe the displayed image.

The same effect can be achieved if one of the electrodes is replaced by a continuous electrode such as 43 as illustrated in FIG. 27, the comb-like electrode 41 being used in 2D mode and the continuous electrode being used in security or 3D mode. A normally white-mode display can operate similarly but requires different electrical driving signals. For the case illustrated in FIG. 26, the upper electrode 43 is driven to create dark regions underneath the electrode pattern, the other electrode 41 being used as normal to produce the desired image. For the electrode arrangement illustrated in FIG. 27, in 2D mode the comb-like electrode 41 is driven to form opaque lines in the liquid crystal layer, the continuous electrode 43 alone being used in 3D or privacy mode.

As an alternative to the use of the patterned electrodes illustrated in FIGS. 26 and 27, the switchable display may include a plurality of pixels divided into first and second sets. The pixels of the first set are used when the display is operating in three dimensional autostereoscopic mode or in a mode where only one observer is to be able to observe the image displayed by the SLM device. The pixels of the second set of pixels are used when a two dimensional view is to be displayed which can be viewed by a plurality of observers simultaneously. Such an arrangement is illustrated in FIG. 28a. It will be recognised from FIG. 28a that the second set of pixels to be used when more than one observer is to be able to observe the displayed image is provided with a repeating series of opaque lines of pitch 1–5 $\mu$m which results in a relatively high level of diffraction. The first set of pixels to be used when only one observer is to be able to observe the displayed image or where an autostereoscopic three dimensional image is to be displayed does not include such a set of lines. As described hereinbefore, the high level of diffraction caused when the pixels are used with the series of opaque lines results in the image being viewable over a relatively large area.

FIG. 28b illustrates an alternative arrangement in which all of the pixels are provided with a series of opaque lines which results in diffraction occurring. The lines are oriented so as to extend horizontally when the pixels are to be used to display a three dimensional stereoscopic image or where the display is being used in circumstances where only a single observer is to be able to observe the displayed image. Switching of the device to enable viewing by more than one observer is achieved by rotating the SLM containing the pixels by 90° so that the opaque lines extend in the vertical direction. The diffraction caused by the presence of the lines then occurs in the horizontal direction rather than in the vertical direction as is the case when the display device is arranged to display a three dimensional autostereoscopic image. The increase in the diffraction in the horizontal direction results in the image being spread over a relatively large area and hence enables more than one observer to view the image simultaneously.

Figure 29:
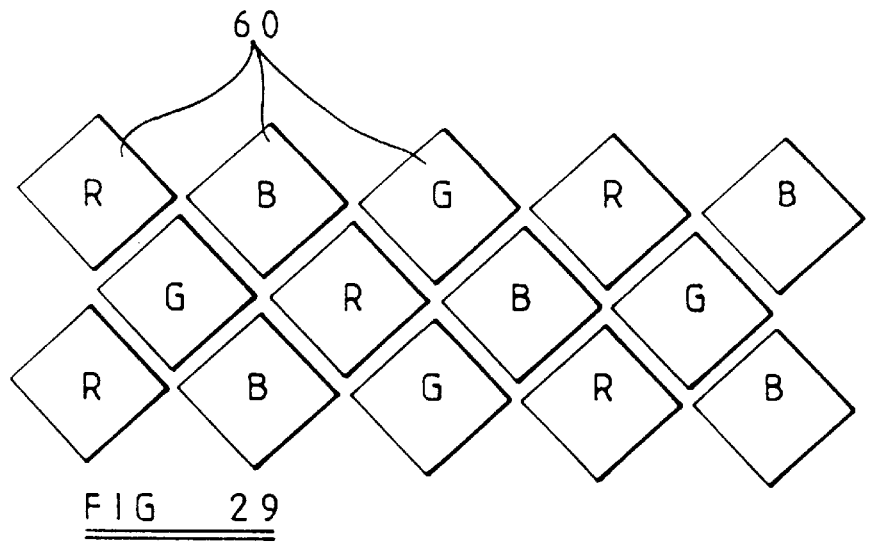
FIG. 29 is a diagrammatic view of an alternative pixel arrangement.

FIG. 29 illustrates an additional technique for minimizing diffraction in a particular direction, this technique being to provide pixels shaped so that the main diffraction orders occur out of the chosen direction. Where the SLM including the pixels is to be used in a 3D autostereoscopic application, diffraction in the horizontal direction causes cross-talk as described hereinbefore. By providing diamond shaped pixels 60 as illustrated in FIG. 29, diffraction in the horizontal direction can be reduced, the majority of the bright fringes occurring in a plane extending at 45° to the horizontal thereby reducing their horizontal extent by a factor of $1/\sqrt{2}$. A similar effect can be achieved using rhombus shaped pixels. The transmission function of the arrangement of FIG. 29 is modified as hereinbefore described so that the total diffraction caused by the pixels is reduced. Thus the diffraction in the desired plane is reduced further.

Figure 30:
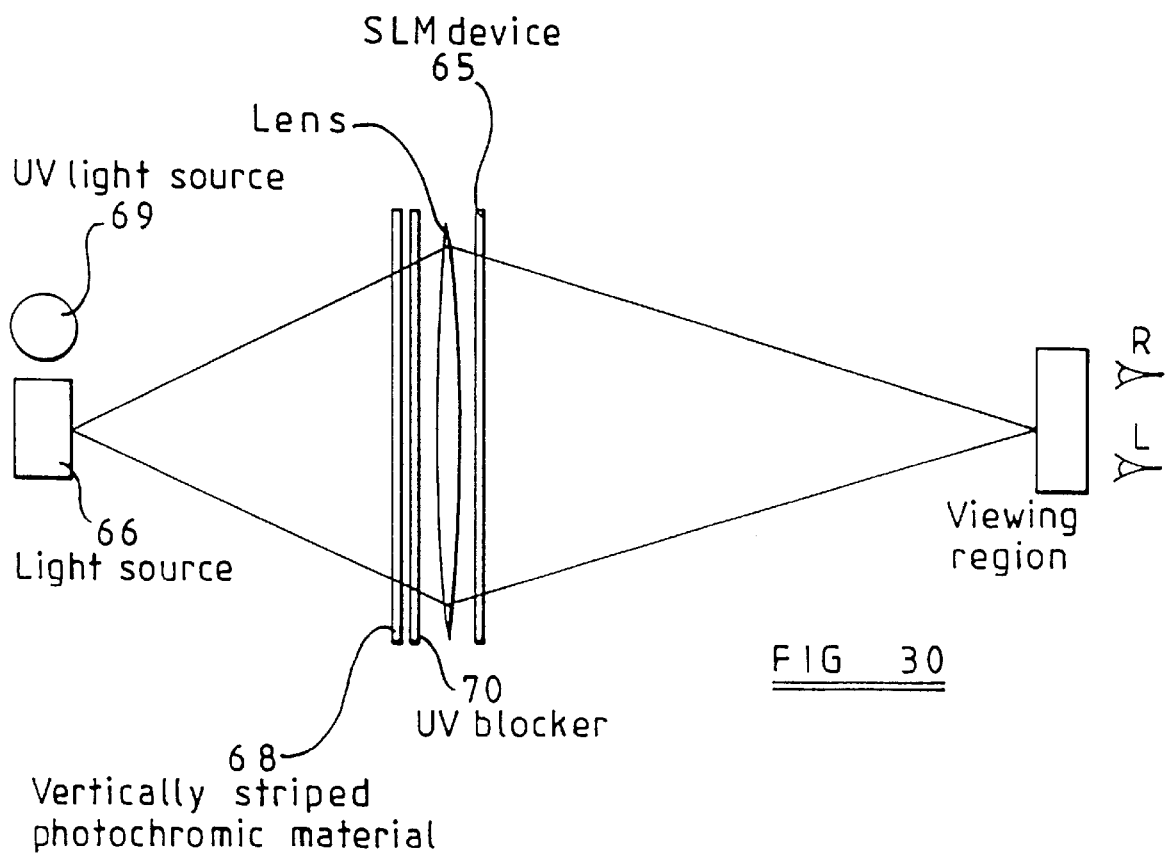

The arrangement of FIG. 30 is intended for use in a switchable display intended to operate in either a security mode or a relatively wide. viewing angle 2D mode. Such a display is achieved using an SLM 65 backlit by a light source 66. A panel 68 of material having photochromic stripes provided thereon is located between the light source 66 and the SLM 65. The photochromic material of the stripes is substantially transparent other than when UV light is incident thereon, whereupon the stripes become opaque to visible light. A UV light source 69 is located adjacent the light source 66, and a UV absorbent panel 70 is located between the panel 68 and the SLM 65.

In use, in security mode, the UV light source 69 is switched off so that the panel 68 is substantially transparent to visible light. An observer located in a relatively narrow, viewing window is then able to view the image displayed by the SLM 65. In wide angle mode, the UV light source 69 is switched on, so that the photochromic material of the panel 68 becomes opaque. The panel 68 therefore includes a plurality of opaque stripes which cause diffraction of light transmitted through the panel 68 and hence spread the light over a relatively large area. The panel 70 filters out the UV lights to prevent the UV light being transmitted to the LCD. The observer can now view the image displayed by the SLM 65 from a wide range of angles.

FIG. 31 illustrates an arrangement similar to that of FIG. 30 but in which the panel 68 and UV light source 69 are omitted, and instead an additional SLM 72 is provided, the SLM 72 being arranged to include a plurality of stripes which are switchable between a state in which the complete SLM 72 is substantially transparent and a state in which the SLM 72 displays a plurality of opaque stripes separated by substantially transparent stripes. In use, in security mode, the SLM 72 is substantially transparent, the opaque stripes being used to cause diffraction when the display is to be used in wide angle display mode.

The amount of diffraction caused by a pixel is dependent upon the wavelength of light transmitted therethrough. Where the invention is used in a colour SLM, the transmission function for each pixel may be tuned dependent upon the wavelength of light to be transmitted by that pixel in order to optimise the change in diffraction.

FIG. 32 illustrates an embodiment in which each picture element is modified so as to include varying complex transmission properties in both the lateral direction of the device and a direction extending normal to the lateral direction. The transmission properties may be varied using any of the techniques described hereinbefore, and either the phase or the amplitude transmission properties, or a combination of the two, may be varied.

Figure 33:
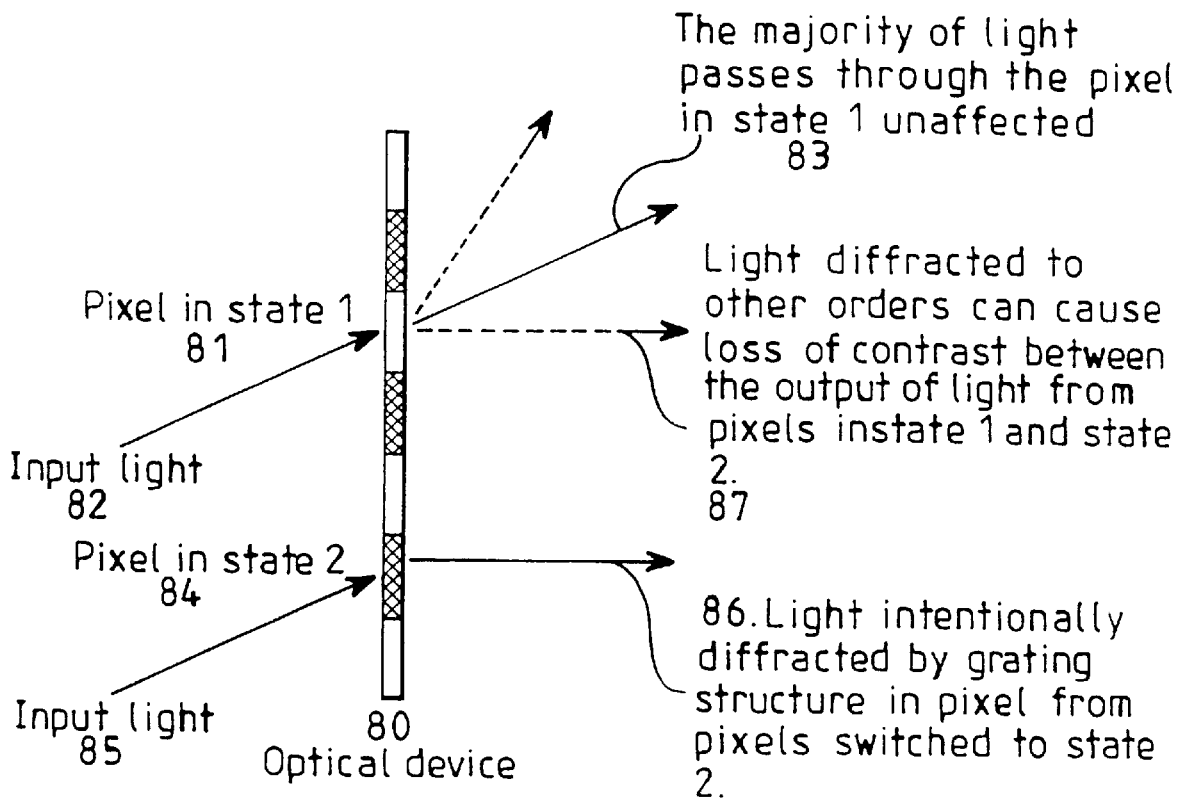
FIG. 33 is a schematic view of part of a projection display constituting an embodiment of the invention.

FIG. 33 illustrates an optical device 80 which forms part of a projection display based on diffraction techniques and using a Schlieren optical system (not shown). This type of display is disclosed in European Patent Application No. 97303990.2. The optical device 80 comprises a plurality of pixels each of which is controlled to be in either a state 1 or a state 2. The effect of a pixel 81 in the state 1 on input light 82 is illustrated in FIG. 33. In this state, the pixel 81 transmits the input light 82 with minimum attenuation and ideally with no deflection or diffraction so that the majority of the light leaves the pixel as shown at 83.

A pixel in the diffractive state 2 is illustrated at 84. The pixel 84 receives input light 85 and acts as a phase-only diffraction grating into the non-zero diffraction orders. As illustrated by way of example in FIG. 33, the output light 86 from the pixel 84 is diffracted mainly into one of the first diffraction orders.

The Schlieren optical system is arranged so that undiffracted light is blocked by a field stop. Whereas diffracted light is collected by a lens for projection, for instance onto a viewing screen. However, as illustrated at 87 in FIG. 33, the effects of diffraction in the pixel 81 in the non-diffractive state 1 are such that light is diffracted into non-zero diffraction orders and some of it passes to the optical system. This results in a reduction of the contrast radio of light projected from the pixels in the different states.

In order to reduce or eliminate unwanted diffraction and hence improve the contrast ratio of the display, the optical device 80 includes any of the techniques described hereinbefore for reducing the effects of diffraction. In particular, each pixel aperture has a fixed or static complex transmission profile which reduces diffracted light and increases non-diffracted light i.e. light "diffracted" into the zero order.

What is claimed is:

1. An optical device comprising a plurality of picture elements, wherein each picture element has an aperture whose complex transmission properties vary across the aperture so as to reduce light diffracted into at least one non-zero diffraction order and to increase light in the zero diffraction order, where the complex transmission properties comprise at least one of amplitude and phase transmission properties.

2. A device as claimed in claim 1, wherein the complex transmission properties vary in a lateral direction of the device.

3. A device as claimed in claim 2, wherein the amplitude transmission properties of each picture element are varied in the lateral direction of the device by absorbent and/or reflective means arranged to absorb and/or reflect light incident thereon, the absorption/reflection properties of the absorbent and/or reflection means varying in the lateral direction of the device.

4. A device as claimed in claim 3, wherein the complex transmission properties of each aperture are passive and fixed irrespective of the active state of the picture element.

5. A device as claimed in claim 4, wherein the absorbent and/or reflective means comprises a patterned colour filter.

6. A device as claimed in claim 4, wherein the absorbent and/or reflective means comprises a patterned black mask layer.

7. A device as claimed in claim 6, wherein the black mask layer is patterned using a lithographic technique.

8. A device as claimed in claim 6, wherein the black mask layer is of varying thickness.

9. A device as claimed in claim 3, wherein the absorbent and/or reflective means comprises a liquid crystal layer constituting the picture elements having varying amplitude transmission properties in the lateral direction of the device.

10. A device as claimed in claim 9, wherein an electrode spaced by a varying distance from the liquid crystal layer, a dielectric layer of varying thickness is provided between the electrode and the liquid crystal layer.

11. A device as claimed in claim 9, wherein each picture element has a first electrode arranged to control the amplitude transmission of a first region of the picture element, and a second electrode arranged to control the amplitude transmission of a second region of the picture element adjacent the first region.

12. A device as claimed in claim 2, further comprising phase variation means for varying the phase transmission across each picture element in the lateral direction of the device.

13. A device as claimed in claim 12, wherein the phase variation means comprises a glass substrate including a region of graded refractive index.

14. A device as claimed in claim 2, wherein the phase and/or amplitude transmission properties vary continuously in the lateral direction of the device.

15. A device as claimed in claim 2, wherein the picture elements are shaped so as to produce diffraction in a direction other than the lateral direction of the device.

16. A device as claimed in claim 15, wherein the picture elements are of diamond shape.

17. A device as claimed in claim 15, wherein the picture elements are of rhombus shape.

18. A device as claimed in claim 1, further comprising diffraction inducing means for selectively inducing diffraction in the lateral direction of the device.

19. A device as claimed in claim 18, wherein the diffraction inducing means comprises a liquid crystal layer arranged to be controlled by a first comb-like electrode to form substantially opaque lines in the liquid crystal layer.

20. A device as claimed in claim 19, further comprising a second comb-like electrode arranged to counteract the effect of the first comb-like electrode.

21. A device as claimed in claim 19, further comprising a continuous electrode arranged to be used instead of the first comb-like electrode when diffraction in the lateral direction is to be minimised.

22. A device as claimed in claim 18, further comprising a first set of picture elements and a second set of picture elements, the second set of picture elements being provided with the diffraction inducing means in the form of a series of substantially opaque stripes.

23. A device as claimed in claim 18, wherein the diffraction inducing means comprises a panel provided with a series of substantially opaque stripes, the panel being rotatable between a position in which diffraction in the lateral direction of the device is minimised and a high diffraction position.

24. A device as claimed in claim 18, wherein the diffraction inducing means comprises a panel provided with stripes of photochromic material, and a radiation source arranged to emit radiation of a wavelength to which the photochromic material is sensitive.

25. A device as claimed in claim 24, wherein the photochromic material is sensitive to ultra-violet light.

26. A device as claimed in claim 18, wherein the diffraction inducing means comprises a spatial light modulator controllable to be substantially transparent or to display a plurality of substantially opaque stripes.

27. A device as claimed in claim 26, wherein the spatial light modulator is a liquid crystal display.

28. A device as claimed in claim 1, wherein the complex transmission properties vary in a direction normal to the lateral direction of the device.

29. A device as claimed in claim 1, further comprising a spatial light modulator.

30. A device as claimed in claim 1, further comprising a parallax barrier.

31. A directional display comprising a device as claimed in claim 1.

32. A display as claimed in claim 31, wherein the display is an autostereoscopic display.

* * * * *